(12) United States Patent
Everaerts et al.

(10) Patent No.: US 6,624,273 B1
(45) Date of Patent: Sep. 23, 2003

(54) PLASTICIZED ACRYLICS FOR PRESSURE SENSITIVE ADHESIVE APPLICATIONS

(75) Inventors: Albert I. Everaerts, Oakdale, MN (US); Eric B. T. Moonen, Koolhof (BE); Peter A. Stark, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/367,454

(22) PCT Filed: Mar. 19, 1999

(86) PCT No.: PCT/US99/06007

§ 371 (c)(1),
(2), (4) Date: Aug. 13, 1999

(87) PCT Pub. No.: WO00/56830

PCT Pub. Date: Sep. 28, 2000

(51) Int. Cl.$^7$ .............................. C08F 2/46; C08F 2/50; C08F 220/46
(52) U.S. Cl. .................. 526/317.1; 526/303.1; 526/308; 526/310; 526/318; 526/319; 526/346; 526/348.2; 526/348.4; 526/913; 522/149; 522/150; 522/153; 522/178; 522/182; 522/181; 522/184; 522/185; 522/186; 522/188; 427/508; 427/516
(58) Field of Search ................... 522/149, 150, 522/153, 178, 182, 181, 184, 185, 186, 188; 427/508, 516; 526/303.1, 308, 310, 317.1, 318, 319, 346, 348.2, 348.4, 913

(56) References Cited

U.S. PATENT DOCUMENTS

| | | |
|---|---|---|
| RE24,906 E | 12/1960 | Ulrich |
| 3,234,062 A | 2/1966 | Morris |
| 3,449,184 A | 6/1969 | Balk |
| 3,681,179 A | 8/1972 | Theissen |
| 3,772,262 A | 11/1973 | Clementi |
| 3,867,222 A | 2/1975 | Plant et al. |
| 4,035,549 A | 7/1977 | Kennar |
| 4,181,752 A | 1/1980 | Martens et al. |
| 4,234,533 A | 11/1980 | Langlands |
| 4,299,639 A | 11/1981 | Bayer |
| 4,303,485 A | 12/1981 | Levens |
| 4,329,384 A | 5/1982 | Vesley et al. |
| 4,330,590 A | 5/1982 | Vesley |
| 4,341,576 A | 7/1982 | Lewis |
| 4,358,329 A | 11/1982 | Masuda |
| 4,362,587 A | 12/1982 | Baudin et al. |
| 4,379,201 A | 4/1983 | Heilmann et al. |
| 4,385,951 A | 5/1983 | Pressau |
| 4,386,991 A | 6/1983 | Shiomi et al. |
| 4,431,471 A | 2/1984 | Mertens et al. |
| 4,452,840 A | 6/1984 | Sato et al. |
| 4,543,283 A | 9/1985 | Curtze et al. |
| 4,554,324 A | 11/1985 | Husman et al. |
| 4,569,960 A | 2/1986 | Blake |
| 4,599,274 A | 7/1986 | Ando et al. |
| 4,619,979 A | 10/1986 | Kotnour et al. |
| 4,671,913 A | 6/1987 | Gen et al. |
| 4,737,559 A | 4/1988 | Kellen et al. |

(List continued on next page.)

FOREIGN PATENT DOCUMENTS

| | | |
|---|---|---|
| DE | 3926897 | 3/1991 |
| DE | 44 06 978 | 9/1995 |
| DE | 44 32 368 A | 3/1996 |
| EP | 0 056 719 B1 | 5/1987 |
| EP | 0 525 403 A1 | 2/1993 |
| EP | 670 338 | 9/1995 |
| EP | 0 710 545 A1 | 5/1996 |
| EP | 853 092 | 7/1998 |
| GB | 2 155 856 | 10/1985 |
| JP | 51-89540 | 8/1976 |
| JP | 96073826 | 3/1996 |
| WO | WO 97/07161 | 2/1997 |
| WO | WO 98/29516 | 7/1998 |

OTHER PUBLICATIONS

Derwent abstract for DE 4432368A.
Derwent abstract for JP 08 295850A.
Masters, K., *Spray Drying: An Introduction to Principles, Operational Practice, and Application*, 2$^{nd}$ edition, Wiley, NY, 1976, pp. 74–93.
Satas, D., *The Handbook of Pressure Sensitive Adhesive Technology*, 2$^{nd}$ edition, Van Nostrand Reinhold, NY, 1989, pp. 172–173.
ASTM Designation: D 3654M–88 (Reapproved 1993), Standard Test Method for Holding Power of Pressure–Sensitive Tapes [Metric].
Kirk–Othmer Encyclopedia of Chemical Technology, 4$^{th}$ edition, John Wiley & Sons, NY, vol. 6, 1993, pp. 635–636.
Fox, T. G., Bulletin of the American Physical Society (ser. 2), 12.3, J5 (1956).
Nichols, R. T. and R. M. Sowers, "Laminated Materials, Glass," *Kirk–Othmer Encyclopedia of Chemical Technology*, 4$^{th}$Ed., pp. 1059–1074, 1995.
Sung Gun Chu, Chapter 8, *Handbook of Pressure Sensitive Adhesive Technology*, Second Edition, Donatas Satas, Editor, pp. 158–203, 1989.

*Primary Examiner*—James J. Seidleck
*Assistant Examiner*—Sanza L. McClendon
(74) *Attorney, Agent, or Firm*—Carolyn V. Peters

(57) ABSTRACT

Non-tacky, base polymers are plasticized into pressure-sensitive adhesives and comprise: a) about 100 parts by weight of a base copolymer having a Tg greater than about 0° C., wherein the base copolymer is formed from and comprises: (1) about 50 to 70% by weight of a high Tg comonomer component, wherein the homopolymer formed from the high Tg comonomer component has a Tg of at least about 20° C.; (2) optionally, up to about 20% by weight based on the total weight of the base copolymer of an acidic comonomer; and (3) about 30 to 50% by weight of one or more low Tg (meth)acrylate comonomer, wherein the Tg homopolymer of the low Tg comonomer is less than about 20° C., and b) about 1 to about 100 parts based on the base copolymer of a nonreactive, non-volatile, non-acrylic-based plasticizing agent.

21 Claims, No Drawings

U.S. PATENT DOCUMENTS

| | | |
|---|---|---|
| 4,843,134 A | 6/1989 | Kotnour et al. |
| 4,925,725 A | 5/1990 | Endo et al. |
| 5,091,258 A | 2/1992 | Moran |
| 5,100,963 A | 3/1992 | Lin |
| 5,147,485 A | 9/1992 | Gajewski et al. |
| 5,178,933 A | 1/1993 | Yoshida et al. |
| 5,190,992 A | 3/1993 | Kato et al. |
| 5,254,388 A | 10/1993 | Melby et al. |
| 5,268,049 A | 12/1993 | Marriott et al. |
| 5,362,801 A | 11/1994 | Amici et al. |
| 5,407,971 A | 4/1995 | Everaerts et al. |
| 5,425,977 A | 6/1995 | Hopfe |
| 5,436,283 A | 7/1995 | Okada et al. |
| 5,445,890 A | 8/1995 | Bayha et al. |
| 5,455,103 A | 10/1995 | Hoagland et al. |
| 5,487,412 A | 1/1996 | Matthews et al. |
| 5,536,347 A | 7/1996 | Moran |
| 5,547,736 A | 8/1996 | Simon et al. |
| 5,595,818 A | 1/1997 | Hopfe et al. |
| 5,616,670 A * | 4/1997 | Bennett et al. ............ 526/264 |
| 5,620,795 A * | 4/1997 | Haak et al. ................ 428/344 |
| 5,637,646 A | 6/1997 | Ellis |
| 5,654,387 A * | 8/1997 | Bennett et al. ............ 428/516 |
| 5,683,798 A * | 11/1997 | Bennett et al. .......... 428/312.6 |
| 5,708,110 A * | 1/1998 | Bennett et al. ............ 526/264 |
| 5,741,542 A | 4/1998 | Williams et al. |
| 5,756,584 A * | 5/1998 | Bennett et al. ............ 525/204 |
| 5,795,650 A * | 8/1998 | Watanabe et al. .......... 428/343 |
| 5,804,610 A | 9/1998 | Hamer et al. |
| 5,883,149 A * | 3/1999 | Bennett et al. ............ 522/120 |
| 5,969,069 A | 10/1999 | Su et al. |
| 5,976,690 A | 11/1999 | Williams et al. |
| 6,074,725 A * | 6/2000 | Kennedy .................... 156/277 |
| 6,126,865 A * | 10/2000 | Haak et al. ................ 252/512 |

\* cited by examiner

PLASTICIZED ACRYLICS FOR PRESSURE SENSITIVE ADHESIVE APPLICATIONS

FIELD OF THE INVENTION

This invention relates to acrylate-based adhesives and in particular plasticized acrylate-based pressure sensitive adhesives.

BACKGROUND OF INVENTION

Pressure-sensitive adhesives are typically coated from solvent or water, extruded as hot-melts, or they are bulk polymerized directly on a release liner or a backing. As more environmentally friendly coating techniques are sought, solvent-and water-free processes have become increasingly desirable.

Today, hot-melt coating is used for pressure-sensitive adhesives based on styrene/rubber based block-copolymers, natural rubbers and acrylate polymers. Block copolymers and natural rubbers can be handled as dry polymer beads or crumbs, which are compounded with tackifiers and oils in the extruder to make the pressure-sensitive adhesives.

Typically, acrylic polymers used for pressure-sensitive adhesives are inherently tacky, which can make the polymer handling and feeding to the equipment challenging. Today, acrylic pressure-sensitive adhesives are delivered as remeltable polymers in drums or pails, extrudable adhesives packaged in siliconized boxes or small pillows and pouches of sticky polymer enclosed in a non-tacky polymer shell. All of these formats require special packaging equipment at the adhesive manufacturing site and special equipment for handling/feeding the polymer at the coating site.

Most of the commercial block copolymer and natural rubber pressure sensitive adhesives use combinations of the elastomer and additives, such as tackifiers and plasticizing agents (or oils). Alternatively, acrylic pressure-sensitive adhesives are often free of any of these additives. Proper selection of the (meth)acrylate and copolymerizable comonomers allows the manufacture of acrylic pressure-sensitive adhesive polymers that are inherently tacky. The absence of additives and the saturated backbone of the acrylate polymer are very common reasons for the selection of acrylic pressure-sensitive adhesives for outdoor applications or when durable bonds need to be made.

However, it is not always possible to achieve the desired pressure-sensitive adhesive properties using acrylic polymers without the use of additives. For example, in order to enhance adhesion against low surface energy substrates, acrylic pressure-sensitive adhesives can be formulated with tackifiers. Since acrylic pressure sensitive adhesives have glass transition temperatures (Tg) that are typically below 0° C., tackifiers are commonly used to decrease the shear storage modulus of the acrylic polymer to improve its surface wetting characteristics. The tackifiers typically have softening points that are well above room temperature, so the Tg of the compounded adhesive will also increase over the untackified acrylate polymer. This effect typically limits the useful amount of tackifiers in a tackified acrylate pressure sensitive adhesive formulation to about 60 pph or less relative to the elastomer.

Tackifiers are often colored and oxidatively unstable, thus sacrificing the unique clarity and stability for which acrylics are known. In addition, it has been found that most commercial tackifiers that are compatible with the polar acrylate matrix will also interfere with bulk polymerization, resulting in much lower molecular weights for the resultant polymer.

Plasticizing agents are less commonly used in acrylate pressure-sensitive adhesives, as plasticizing agents typically decrease the Tg of the compounded adhesive, resulting in a loss of peel strength. Actually, plasticizing agent migration into acrylic pressure sensitive adhesives is one of the well-known failure mechanisms in applications against plasticized polyvinyl chloride.

SUMMARY OF INVENTION

Briefly, in one aspect of the present invention essentially non-tacky, polymers are plasticized into pressure-sensitive adhesives. Plasticized polymer based pressure-sensitive adhesives of the present invention comprises:

a. about 100 parts by weight of a base copolymer having a Tg greater than about 0° C., wherein the base copolymer is formed from and comprises:
 (1) about 50 to 70% by weight of a high Tg comonomer component, wherein the homopolymer formed from the high Tg comonomer component has a Tg of at least about 20° C.;
 (2) optionally, up to about 20% by weight based on the total weight of the base copolymer of an acidic comonomer; and
 (3) about 30 to 50% by weight of one or more low Tg (meth)acrylate comonomer, wherein the Tg of the homopolymer of the low Tg comonomer is less than about 20° C., and
b. about 1 to about 100 parts based on the base copolymer of a non-reactive, non-volatile, non-acrylic-based plasticizing agent.

The plasticized pressure-sensitive adhesives of the present invention have several general advantages over conventional acrylate pressure-sensitive adhesive compositions. Since the base copolymer exhibits little or no tack prior to its combination with the plasticizing agent, new means for handling, processing and delivering these compositions can be practiced. The base copolymer can be transported and processed similarly to other elastomeric materials used in pressure-sensitive adhesive compositions, without the special packaging and processing generally required with traditional acrylate pressure-sensitive adhesives. When the base copolymer is in particulate form, such as dried particles prepared using suspension, emulsion or dispersion polymerization methods or cryo-grinding, powder handling and coating techniques can be employed and exploited to create new pressure-sensitive-adhesive materials and new product applications. Furthermore, the pressure-sensitive properties of the composition can be activated when desired by the formulator or when required by the application.

Conventional understanding of the effect of the addition of plasticizing agents to pressure-sensitive adhesives is that adhesive performance degrades following plasticization. However, by combining the plasticizing agent with a high Tg, high shear storage modulus base copolymer, stable and useful pressure-sensitive adhesive materials can readily be formulated.

In addition, it has been found that some specific classes of plasticizing agent show very limited interference with radiation crosslinking and polymerization processes. Since plasticizing agents are typically free of unsaturation, they are as oxidatively stable as the base copolymer. This inertness toward radiation opens some novel opportunities for cured adhesives where the plasticizing agents can be used as an alternative for tackifiers. Tackifiers are known to interfere with UV processing. Plasticizing agents are also generally significantly lower in cost than tackifiers and can be selected to be compatible and non-volatile with respect to the base copolymer.

In addition, with regard to tackifying agents, it has been found that some tackifiers can cause allergenic response in some medical adhesive applications. Use of plasticizing agents along with a base copolymer to form plasticized pressure sensitive adhesives according to the present invention can offer alternative routes towards modification of base copolymer properties to yield non-allergenic compositions for skin and other medical adhesive applications.

Advantageously, the adhesives of the present invention exhibit fluid-like characteristics despite generally high molecular weights of the base copolymer. Fluidity of the plasticized pressure-sensitive adhesive compositions occurs at lower temperatures as compared to the unplasticized base copolymer. Thus, the adhesives of the present invention provide a distinct advantage for applications using heat sensitive substrates because coatable viscosities can be obtained at lower melt temperatures. Furthermore, because the adhesives of the present invention have a low melt viscosity, they tend to retain less orientation and relax more readily during extrusion. Lower melt viscosities also permit faster coating speeds, an important consideration in the production and commercialization of articles coated with the plasticized pressure-sensitive adhesive composition.

The addition of plasticizing agents to the pressure-sensitive adhesives of the present invention can also provide other processing advantages. In waterborne coatings, the plasticizing agent may enhance film formation of the plasticized pressure-sensitive adhesive by promoting coalescence of the drying emulsion. If solventless polymerization methods are desired, the plasticizing agent can also serve as a non-volatile "solvent" for immiscible or incompatible mixtures of high Tg comonomers, low Tg (meth)acrylate comonomers and optional acidic comonomers. Such incompatible comonomer mixtures typically require a volatile reaction medium, such as an organic solvent or water, to promote effective copolymerization. Unlike these volatile reaction media, the plasticizing agent does not have to be removed to make a pressure sensitive adhesive.

In another aspect of the present invention, a method of coating a plasticized polymer based pressure sensitive adhesive comprises the steps of:
  a. admixing about 100 parts by weight of a base copolymer having a Tg greater than about 0° C. and about 1 to about 100 parts of a non-reactive, non-volatile, non-acrylic-based plasticizing agent, wherein the base copolymer is formed from:
    (1) about 50 to 70% by weight of a high Tg comonomer component, wherein the homopolymer formed from the high Tg comonomer component has a Tg of at least about 20° C.;
    (2) optionally, up to about 20% by weight based on the total weight of the base copolymer of an acidic comonomer; and
    (3) about 30 to 50% by weight of one or more low Tg (meth)acrylate comonomer, wherein the Tg of the homopolymer of the low Tg comonomer is less than about 20° C., and
  b. coating the admixture prepared according to part (a) onto a substrate from a solvent or aqueous solution.

This method of coating can be accomplished using various conventional coating techniques, such as knife and blade coating, as well as die and curtain coating.

In an alternative coating method, a plasticized polymer based pressure sensitive adhesive is hot-melt coated comprising the steps of:
  a. admixing about 100 parts by weight of a base copolymer having a Tg greater than about 0° C. and about 1 to about 100 parts of a non-reactive, non-volatile, non-acrylic-based plasticizing agent at a temperature sufficient to melt and thoroughly mix the base copolymer and plasticizing agent, wherein the base copolymer is formed from:
    (1) about 50 to 70% by weight of a high Tg comonomer component, wherein the homopolymer formed from the high Tg comonomer component has a Tg of at least about 20° C.;
    (2) optionally, up to about 20% by weight based on the total weight of the base copolymer of an acidic comonomer; and
    (3) about 30 to 50% by weight of one or more low Tg (meth)acrylate comonomer, wherein the Tg of the homopolymer of the low Tg comonomer is less than about 20° C., and
  b. hot melt coating the admixture prepared according to part (a) onto a substrate.

In another aspect of the present invention, the plasticized polymer based pressure sensitive adhesive using radiation polymerization methods comprising the steps of:
  a. preparing a prepolymeric syrup comprising:
    (1) about 50 to 70% by weight of a high Tg comonomer component, wherein the homopolymer formed from the high Tg comonomer component has a Tg of at least about 20° C.;
    (2) optionally, up to about 20% by weight based on the total weight of the base copolymer of an acidic comonomer; and
    (3) about 30 to 50% by weight of one or more low Tg (meth)acrylate comonomer, wherein the Tg of the homopolymer of the low Tg comonomer is less than about 20° C., and
  b. combining the prepolymeric syrup with about 1 to 100 parts based on 100 parts of the sum of components a(1) to a(3) of a non-reactive, non-volatile, non-acrylic-based plasticizing agent to form a polymerizable mixture; and
  c. exposing the polymerizable mixture to radiation sufficient to polymerize the polymerizable mixture and to form the plasticized polymer based pressure sensitive adhesive.

Alternatively, the radiation polymerized plasticized polymer based pressure sensitive adhesive can be prepared by combining the non-reactive, non-volatile, non-acrylic-based plasticizing agent with the comonomers to form a prepolymeric syrup, then exposing the prepolymeric syrup to radiation.

Due to the distinct advantage of using powdered components to prepare a pressure sensitive adhesive, a method of coating a plasticized polymer based pressure sensitive adhesive comprising the steps of:

a. admixing about 100 parts by weight of a powdered base copolymer having a Tg greater than about 0° C. and about 1 to about 100 parts of a solid, powdered, non-reactive, non-acrylic-based plasticizing agent, wherein the base copolymer is formed from:
  (1) about 50 to 70% by weight of a high Tg comonomer component, wherein the homopolymer formed from the high Tg comonomer component has a Tg of at least about 20° C.;
  (2) optionally, up to about 20% by weight based on the total weight of the base copolymer,of an acidic comonomer; and
  (3) about 30 to 50% by weight of one or more low Tg (meth)acrylate comonomer, wherein the Tg of the homopolymer of the low Tg comonomer is less than about 20° C., and
b. powder coating the admixture prepared according to part (a) onto a substrate, and
c. heating all or a portion of the coated admixture to a temperature sufficiently high enough to melt the solid, powdered, non-reactive plasticizing agent.

In yet another aspect, a method of coating a plasticized polymer based pressure sensitive adhesive comprises the steps of:

a. powder coating a layer of a powdered base copolymer having a Tg greater than about 0° C. onto a substrate, wherein the base copolymer is formed from:
  (1) about 50 to 70% by weight of a high Tg comonomer component, wherein the homopolymer formed from the high Tg comonomer component has a Tg of at least about 20° C.;
  (2) optionally, up to about 20% by weight based on the total weight of the base copolymer of an acidic comonomer; and
  (3) about 30 to 50% by weight of one or more low Tg (meth)acrylate comonomer, wherein the Tg of the homopolymer of the low Tg comonomer is less than about 20° C., and
b. coating a liquid, non-reactive, non-acrylic-based plasticizing agent over all or a portion of the powdered base copolymer layer such that about 100 parts of the coated base copolymer are plasticized with about 1 to 100 parts of the non-reactive, non-acrylic-based plasticizing agent.

In a related aspect of the present invention, a method of coating a plasticized polymer based pressure sensitive adhesive comprises the steps of:

a. coating a layer of a base copolymer having a Tg greater than about 0° C. onto a substrate, wherein the base copolymer is formed from:
  (1) about 50 to 70% by weight of a high Tg comonomer component, wherein the homopolymer formed from the high Tg comonomer component has a Tg of at least about 20° C.;
  (2) optionally, up to about 20% by weight based on the total weight of the base copolymer of an acidic comonomer; and
  (3) about 30 to 50% by weight of one or more low Tg (meth)acrylate comonomer, wherein the Tg of the homopolymer of the low Tg comonomer is less than about 20° C., and
b. coating a liquid or solid, non-reactive, non-acrylic-based plasticizing agent over all or a portion of the powdered base copolymer layer such that about 100 parts of the coated base copolymer are plasticized with about 1 to 100 parts of the non-reactive, non-acrylic-based plasticizing agent.

As used herein:

"pressure-sensitive adhesive" or "PSA" refers to a viscoelastic material that possesses the following properties: (1) aggressive and permanent tack, (2) adherence with no more than finger pressure, (3) sufficient ability to hold onto an substrate, and (4) sufficient cohesive strength to be removed cleanly from the substrate.

"compatible" refers to plasticizing agents that:
  1) exhibit no gross phase separation from the base copolymer when blended in the prescribed amounts
  2) once mixed with the base copolymer, do not significantly phase separate from the base copolymer upon aging; and
  3) function as a rheological modification agent for the base copolymer, such that the plasticized composition exhibits pressure-sensitive properties as defined above.

"non-reactive" refers to plasticizing agents that do not contain free radically reactive ethylenically unsaturated groups that could co-react with the comonomers of the base copolymer or functionalities that significantly inhibit the polymerization of these monomers;

"non-volatile" refers to plasticizing agents that, when compounded with the base copolymer of this invention, generate less than 3% VOC (volatile organic content). The VOC content can be determined analogously to ASTM D 5403-93 by exposing the coated composition to 100+-5° C. in a forced draft oven for 1 hour. If less than 3% plasticizing agent is lost from the plasticized pressure-sensitive adhesive composition, then the plasticizing agent is considered "non-volatile".

"solventless" refers to adhesive polymerizable mixtures that are essentially 100% solid systems (i.e. essentially free of V.O.C.). Usually, such polymerizable mixtures have no more than about 5% organic solvents or water, more typically no more than about 3% organic solvents or water. Most typically, such polymerizable mixtures are free of organic solvents and water.

DESCRIPTION OF THE PREFERRED EMBODIMENT(S)

The plasticized high Tg acrylic polymer based pressure-sensitive adhesives of the present invention comprise a mixture of:

a. about 100 parts by weight of a base copolymer having a Tg greater than about 0° C., wherein the base copolymer is formed from and comprises:
  (1) about 50 to 70% by weight of a high Tg comonomer component, wherein the homopolymer formed from the high Tg comonomer component has a Tg of at least about 20° C.;
  (2) optionally, up to about 20% by weight based on the total weight of the base copolymer of an acidic comonomer; and
  (3) about 30 to 50% by weight of one or more low Tg (meth)acrylate comonomer, wherein the Tg of the homopolymer of the low Tg comonomer is less than about 20° C., and
b. about 1 to about 100 parts based on the base copolymer of a non-reactive, non-volatile, non-acrylic-based plasticizing agent.

Base Copolymer

The base copolymer of the plasticized pressure sensitive adhesive composition of the present invention is low in tack or totally tack-free at room temperature (i.e. about 20 to 25° C.). These non-tacky or low tack copolymers or coatings made therefrom can be handled in a completely different way than typical acrylate pressure-sensitive adhesive materials. Conventional acrylate pressure-sensitive adhesives are inherently and highly tacky and require special packaging, liners or low adhesion backsizes to handle, transport or otherwise readily process. By combining the high Tg base copolymer and plasticizing agent prior to coating or by plasticizing a coating of the high Tg base copolymer prior to the application of the product as a pressure sensitive adhesive, a number of unique and useful products and application methods can be obtained.

The base copolymer derives its low tack or no tack characteristics at room temperature from its high Tg and high shear storage modulus. In general, the high Tg and high modulus base copolymers have significant glassy character and are non-elastomeric in nature. The Tg of the base copolymer can be determined by either analytical methods, such as well known calorimetric or dynamic/mechanical techniques, or may be calculated based on the types and proportion of comonomers used to form the copolymer. For the purposes of the present application, the Tg of the base copolymers is calculated using the Tg of the homopolymers of each comonomer and the weight fraction of the comonomers, as shown in the following equation of Fox, T. G., Bull. Am. Phys. Soc. (Ser. 2) 1:123 (156), $$1/T_g = W_a/T_{g_a} + W_b/T_{g_b} + W_c/T_{g_c}$$

wherein $T_g$, $T_{g_a}$, $T_{g_b}$ and $T_{g_c}$ designate the glass transition temperature (in °K) of a terpolymer of comonomers a, b and c, a homopolymer of comonomer a, a homopolymer of comonomer b, and a homopolymer of comonomer c, respectively. $W_a$, $W_b$ and $W_c$ are the weight fractions of comonomers a, b, and c, respectively, wherein $W_a + W_b + W_c = 1$.

In addition to having a Tg that is at least about 0° C., the low tack or non-tacky base copolymers of the present invention also possess a shear storage modulus of at least $5 \times 10^5$ Pascals at 23° C. and 1 Hz. This threshold [as described by D. Satas in The Handbook of Pressure Sensitive Adhesive Technology, 2nd ed., Von Nostrand Reinhold: New York, p. 172–173 (1989), incorporated by reference herein] exceeds the Dahlquist Criterion which states that, to exhibit pressure sensitive adhesive properties at room temperature (i.e., to be "tacky"), such pressure sensitive adhesive must have a 1-second creep compliance greater than $1 \times 10^{-6}$ cm$^2$/dyne. This creep compliance value translates into a maximum shear storage modulus of $5 \times 10^6$ dynes/cm$^2$ or $5 \times 10^5$ Pascals, at 23° C. and 1 Hz.

Thus, to transform the base copolymer to a material that exhibits pressure sensitive adhesive properties, the plasticizing agent should be chosen to lower the base copolymer's Tg to below about 10° C., preferably below 0° C., and its shear storage modulus to below the Dahlquist Criterion.

High Tg Comonomers

The selection of the appropriate high Tg comonomer is an important variable to consider. The high Tg comonomer not only provides mechanical properties that ultimately effect the pressure sensitive adhesive properties of the plasticized acrylate pressure sensitive adhesive composition, but also can be used to control the solubility parameter of the base copolymer and its compatibility with plasticizing agents. For example, if use of plasticizing agents having high hydrocarbon character is desired, then base copolymers containing high Tg comonomers such as isobornyl (meth)acrylate or cyclohexyl acrylate may be more effectively and efficiently plasticized than analogous base copolymers containing high Tg comonomers having lower hydrocarbon character (e.g., methyl methacrylate, ethyl methacrylate, etc.).

The high Tg comonomers of the present invention are ethylenically unsaturated monomers, preferably monoethylenically unsaturated monomers having a homopolymer Tg greater than about 20° C., most preferably greater than about 50° C., and can be copolymerized with the low Tg (meth)acrylate monomers described below. Examples of useful high Tg comonomers include, but are not limited to, substituted lower (C1–C4) alkyl methacrylates such as, methyl methacrylate, ethyl methacrylate; vinyl esters such as vinyl acetate, vinyl pivalate; and vinyl neononanoate; N-vinyl lactams such as, N-vinyl pyrrolidone; N-vinyl caprolactam; substituted (meth)acrylamides such as, N,N-dimethyl acrylamide, N,N-dimethyl methacrylamide, N,N-diethyl acrylamide, and N,N-diethyl methacrylamide; (meth)acrylonitrile; maleic anhydride; acrylate and methacrylate esters of cycloalkyl; aromatic or bridged cycloalkyl alcohols such as isobornyl acrylate, isobornyl methacrylate, 4-t-butylcyclohexyl methacrylate, cyclohexyl methacrylate, phenyl acrylate, phenylmethacrylate, 2-naphthyl acrylate, and 2-naphthyl methacrylate; styrene and substituted styrene derivatives such as α-methyl styrene; and mixtures thereof. Particularly preferred are ethyl methacrylate, methyl methacrylate, isobornyl acrylate, isobornyl methacrylate, 4-t-butyl cyclohexyl methacrylate, 4-t-butyl cyclohexyl acrylate, cyclohexyl methacrylate, N,N-dimethyl acrylamide, N,N-dimethyl methacrylamide, acrylonitrile, and mixtures thereof.

Low Tg (Meth)Acrylate Comonomers

The base copolymer of the present invention also contains a one or more low Tg (meth)acrylate comonomer. The low Tg (meth)acrylate comonomers provide a means to adjust the solubility parameter, the Tg and modulus of the base copolymer. For example, higher levels of this low Tg component will decrease the overall Tg of the base polymer, allowing for more efficient plasticization of the base copolymer to a pressure-sensitive adhesive material (i.e. lower levels of plasticizing agent are needed).

Examples of useful low Tg (meth)acrylate comonomers include monofunctional unsaturated monomers selected from the group consisting of (meth)acrylate esters of non-tertiary alkyl alcohols, the alkyl groups of which comprise from about 1 to about 18, preferably about 4 to about 12 carbon atoms; and mixtures thereof. Preferred (meth)acrylate monomers, when homopolymerized, have a Tg below 20° C., preferably below 0° C. and have the following general Formula (I):

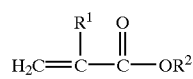

Formula (I)

wherein $R^1$ is H or $CH_3$, the latter corresponding to where the (meth)acrylate monomer is a methacrylate monomer. $R^2$ is broadly selected from linear or branched hydrocarbon groups and may contain one or more heteroatoms. The number of carbon atoms in the hydrocarbon group is preferably about 1 to about 18, and more preferably about 4 to about 12.

Examples of suitable (meth)acrylate monomers useful in the present invention include, but are not limited to, methylacrylate, ethylacrylate, n-butyl acrylate, decyl acrylate, 2-ethylhexyl acrylate, hexyl acrylate, isoamyl acrylate, isodecyl acrylate, isononyl acrylate, isooctyl acrylate, lauryl acrylate, 2-methyl butyl acrylate, 4-methyl-2-pentyl acrylate, ethoxyethoxyethyl acrylate and mixtures thereof. Particularly preferred are 2-ethylhexyl acrylate, isooctyl acrylate, lauryl acrylate, ethoxyethoxyethyl acrylate, and mixtures thereof.

Instead of or in addition to lower Tg acrylates and methacrylates, lower Tg vinyl esters such as vinyl-2-ethylhexanoate; vinyl neodecanoate and the like can also be used.

Acidic Comonomers

Similar to the high Tg comonomers used in the base copolymer of the present invention, the optional acidic comonomers also contribute to the mechanical properties of the plasticized pressure sensitive adhesive composition. In addition, such acidic comonomers enhance internal reinforcement and surface affinity of the resultant plasticized pressure sensitive adhesive composition. Useful acidic comonomers include, but are not limited to, those selected from ethylenically unsaturated carboxylic acids, ethylenically unsaturated sulfonic acids, ethylenically unsaturated phosphonic acids, and mixtures thereof. Examples of such compounds include those selected from acrylic acid, methacrylic acid, itaconic acid, fumaric acid, crotonic acid, citraconic acid, maleic acid, β-carboxyethyl acrylate, 2-sulfoethyl methacrylate, styrene sulfonic acid, 2-acrylamido-2-methylpropane sulfonic acid, vinyl phosphonic acid, and the like, and mixtures thereof. Due to their availability and effectiveness in reinforcing (meth)acrylate pressure sensitive adhesives, particularly preferred acidic monomers are the ethylenically unsaturated carboxylic acids, most preferably acrylic acid, β-carboxyethyl acrylate and methacrylic acid.

The base copolymer of the present invention comprises, based upon 100 parts by weight total, about 30 to about 70 parts by weight of a high Tg comonomer, about 30 to about 50 parts by weight of a low Tg (meth)acrylate comonomer, and optionally up to about 20 parts by weight of an acidic comonomer. Preferably, the base copolymer of the present invention comprises about 40 to about 65 parts by weight of a high Tg comonomer, about 35 to about 50 parts by weight of a low Tg (meth)acrylate comonomer, and about 2 to about 15 parts by weight of an acidic comonomer.

The ratio of each component in the high Tg base copolymer will have to be chosen to optimize the performance of both the non-plasticized and plasticized polymer. For example, higher levels of the high Tg monomer component will increase the overall Tg of the base copolymer. However, the increased Tg (and modulus) of this type of base copolymer may generally use higher levels of plasticizing agent to bring the modulus of the compounded adhesive down into the range where the polymer behaves as a pressure-sensitive adhesive. In addition, a lower Tg base copolymer will not only typically use lower levels of plasticizing agent to became tacky but, at room temperature, it will also more readily absorb the plasticizing agent than a higher Tg base polymer. Dependant on the desired end use, higher or lower levels of plasticizing agent may be beneficial. For example, if high cohesive strength is desired, lower levels of plasticizing agent would be recommended. If aggressive tack or low peel resistance are required, higher levels of plasticizing agent are particularly useful.

Proper selection of the monomer components of the base polymer can also enhance the compatibility of the plasticizing agent withithe polymer matrix. For example, if a plasticizing agent is to be used with high hydrocarbon character, it may be desirable to use higher alkyl (meth)acrylate components, such as isooctylacrylate, 2-ethylhexylacrylate or laurylacrylate, and a limited amount of acidic comonomer (such as acrylic acid) in the base copolymer.

Plasticizing Agents

Plasticizing agents selected for use in the polymerizable compositions of the present invention possess a range of properties. Generally, the plasticizing agents can be liquid or solid, have a range of molecular weights and architectures, are compatible with the base copolymers, monomeric or polymeric, non-volatile and non-reactive. Additionally, mixtures of solid and liquid, monomeric and polymeric and other combinations of plasticizing agents can be used in the present invention.

Generally, liquid plasticizing agents are readily:compoundable with the base copolymers and/or can be chosen to be miscible with comonomers for plasticized pressure sensitive adhesive compositions prepared using bulk polymerization methods. In addition, liquid plasticizing agents may be delivered directly to non-tacky base copolymers or onto already coated base copolymer films and are typically absorbed quickly to activate the pressure-sensitive adhesive properties.

Although somewhat more challenging to use, solid plasticizing agents can advantageously be used in applications, processes or articles where the controlled plasticization of the base copolymer is desired. For example, hot melt processible pressure sensitive adhesive compositions can be easily transported and handled prior to melt compounding if both the base copolymer and plasticizing agent components are solid and non-tacky. Once heated to the melting or glass transition temperature of the solid plasticizing agent, the base copolymer is plasticized and the mixture exhibits pressure sensitive adhesive properties.

Additionally, the plasticizing agents can have a range of molecular weights and architectures. That is, the plasticizing agents can be either polymeric or monomeric in nature. Typically, monomeric plasticizing agents are derived from low molecular weight acids or alcohols, which are then esterified with respectively a monofunctional alcohol or monofunctional acid. Examples of these are esters of mono- and multibasic acids, such as isopropyl myristate, dibutyl phthalate, diisoctyl phthalate, dibutyl adipate, dibutylsebacate and the like. Useful polymeric plasticizing agents are non-acrylic and are typically derived from cationically or free-radically polymerizable, condensation polymerizable or ring-opening polymerizable monomers to make low molecular weight polymers. Examples of these polymeric plasticizing agents include materials such as polyurethanes, polyureas, polyvinylethers, polyethers, polyesters and the like. As used in this application "non-acrylic" means the polymeric plasticizing agent contains less than about 20% by weight of any (meth)acrylic monomers.

Useful plasticizing agents are compatible with the base copolymer, such that once the plasticizing agent is mixed with the base copolymer, the plasticizing agent does not phase separate from the base copolymer. By "phase separation" or "phase separate", it is meant that by differential scanning calorimetry (DSC) no detectable thermal transition, such as a melting or glass transition temperature can be found for the pure plasticizing agent in the plasticized pressure sensitive adhesive composition. Some migration of the plasticizing agent from or throughout the plasticized pressure-sensitive adhesive can be tolerated, such as minor separation due to composition equilibrium or temperature influences, but the plasticizing agent does not migrate to the extent of phase separation between the base copolymer and the plasticizing agent. When polymeric plasticizing agents are used, they tend to be a bit more limited in their applications than monomeric plasticizing agents and, in general, the lower the molecular weight of the polymeric plasticizing agent, the higher their compatibility with the base copolymer. Plasticizing agent compatibility with the base copolymer can also be dependent upon the chemical nature of the plasticizing agent and the monomeric content of the base copolymer. For example, polymeric plasticizing agents based on polyether backbones (such as polyethylene glycols) are observed to be more compatible than polyester plasticizing agents, especially when higher levels of acidic comonomer are used.

Plasticizing agents used in the present invention are also non-volatile. If the plasticizing agent is to be used in bulk polymerization processes where the base copolymer is formed in the presence of the plasticizing agent, then the plasticizing agent not only solvates the monomers, but also remains present and stable under polymerization reaction conditions to serve as a polymerization medium for the high Tg comonomers, low Tg (meth)acrylate comonomers and optional acidic comonomers. The presence of the plasticizing agent in the plasticized pressure sensitive adhesive compositions operates to maintain adhesion properties of the adhesive compositions.

Additionally, useful plasticizing agents are non-reactive, thus preventing copolymerization with the comonomers of the base copolymer. Thus, plasticizing agents having acrylate functionality, methacrylate functionality, styrene functionality, or other ethylenically unsaturated, free radically reactive functional groups are generally not used.

Particularly useful plasticizing agents include polyalkylene oxides having weight average molecular weights of about 150 to about 5,000, preferably of about 150 to about 1,500, such as polyethylene oxides, polypropylene oxides, polyethylene glycols; alkyl or aryl functionalized polyalkylene oxides, such as PYCAL 94 (a phenyl ether of polyethylene oxide, commercially available from ICI Chemicals); benzoyl functionalized polyethers, such as Benzoflex 400 (polypropylene glycol dibenzoate, commercially available from Velsicol Chemicals) and monomethyl ethers of polyethylene oxides; monomeric adipates such as dioctyl adipate, dibutoxyethoxyethyl adipate and dibutoxypropoxypropyl adipate; polymeric adipates such as polyester adipates; citrates, such as acetyltri-n-butyl citrate, phthalates such as butyl benzylphthalates, trimellitates, sebacates, polyesters, such as those known under the tradename Paraplex (available from C.P.Hall Co); phosphate esters, such as those known under the tradename of Santicizer (available from Monsanto) such as 2-ethylhexyl diphenyl diphosphate and t-butylphenyl diphenyl phosphate; glutarates such as Plasthall 7050 (a dialkyl diether glutarate available from C.P.Hall Co.); and mixtures thereof.

The plasticizing agent is typically used in amounts of from about 1 to 100 parts by weight per 100 parts of the base copolymer. Preferably, the plasticizing agent is present in amounts from about 3 to 50 pph. Most preferably, the plasticizing agent is present in amounts from about 3 to about 40 pph.

The amount of plasticizing agent used depends upon the type and ratios of the high Tg comonomers, low Tg (meth)acrylate comonomers, and optional acidic comonomers employed in the base copolymer and the chemical class and molecular weight of the plasticizing agent used in the composition. For example, as the modulus of the base copolymer increases, higher levels of plasticizing agent are necessary to bring the compounded adhesive modulus down into the useful range for pressure-sensitive bond making (i.e., the shear storage modulus is below the Dahlquist Criterion). As the amount of plasticizing agent in the pressure sensitive adhesive is increased, maintaining cohesive strength becomes increasingly difficult, thus creating a practical upper limit on the amount of plasticizing agent that can be tolerated in the final pressure sensitive adhesive. High levels of plasticizing agent may be beneficial if properties such as aggressive tack, low temperature performance or smooth peel are required. Typically, as the molecular weight of the base copolymer drops, the maximum plasticizing agent loading that can be used and still obtain good cohesive strength also drops. Very similarly, if high-temperature shear holding is desired, lower plasticizing agent levels are recommended.

Considering practical constraints for pressure sensitive adhesive formulation, it should be clear that there is also an upper limit for the shear modulus of the base polymer to begin with and still enable pressure-sensitive behavior with plasticizing agent loadings of 100 pph or less. Actual modulus values are difficult to define as it strongly depends on the type of plasticizing agent, plasticizing efficiency and the compatibility of the plasticizing agent with the base copolymer.

Initiators

A free radical initiator is preferably added to aid in the copolymerization of the high Tg comonomers, low Tg (meth)acrylate comonomers and optional acidic comonomers. The type of initiator used depends on the polymerization process. Photoinitiators which are useful for polymerizing the polymerizable mixture monomers include benzoin ethers such as benzoin methyl ether or benzoin isopropyl ether, substituted benzoin ethers such as 2-methyl-2-hydroxylpropiophenone, aromatic sulfonyl chlorides such as 2-naphthalenesulfonyl chloride, and photoactive oxides such as 1-phenyl-1,1-propanedione-2-(o-ethoxycarbonyl) oxime. An example of a commercially available photoinitiator is IRGACURE 651 (2,2-dimethoxy-1,2-diphenylethane-1-one, commercially available from Ciba-Geigy Corporation,). Generally, the photoinitiator is present in an amount of about 0.005 to 1 weight percent based on the weight of the copolymerizable monomers. Examples of suitable thermal initiators include AIBN (2,2'-azobis (isobutyronitrile), hydroperoxides, such as tert-butyl hydroperoxide, and peroxides, such as benzoyl peroxide and cyclohexane peroxide.

Chain Transfer Agents

Optionally, the composition also includes a chain transfer agent to control the molecular weight of the base copolymer. Chain transfer agents are materials that regulate free radical polymerization and are generally known in the art. Suitable chain transfer agents include halogenated hydrocarbons such as carbon tetrabromide; sulfur compounds such as lauryl mercaptan, butyl mercaptan, ethanethiol, isooctylthioglycolate (IOTG), 2-ethylhexyl thioglycolate, 2-ethylhexyl mercaptopropionate, pentaerythritol mercaptopropionate, 2-mercaptoimidazole, and 2-mercaptoethyl ether.

The amount of chain transfer agent that is useful depends upon the desired molecular weight and the type of chain transfer agent. The chain transfer agent is typically used in amounts from about 0.001 part to about 10 parts by weight per 100 parts of the base copolymer, and preferably from about 0.01 part to about 0.5 parts, and most preferably from about 0.02 part to about 0.20 part.

Crosslinking Agents

The plasticized pressure sensitive adhesive compositions of the present invention can also include a crosslinking agent to improve the internal strength, solvent resistance and other properties of the pressure sensitive adhesive compositions. The crosslinking agent is present in an amount of from about 0.05 to about 5 percent by weight based on 100 parts of the base copolymer or based upon 100 parts by weight of the comonomers employed.

The crosslinking agents are selected according to the polymerization and coating method used. Preferred crosslinking agents for the base copolymers prepared via photopolymerized solventless bulk methods are multifunctional acrylates such as 1,6-hexanediol diacrylate as well as those disclosed in U.S. Pat. No. 4,379,201, incorporated herein by reference, such as trimethylolpropane triacrylate, pentaerytlritol tetracrylate, 1,2-ethylene glycol diacrylate, and 1,12-dodecanediol diacrylate. Other useful crosslinking agents include the substituted triazines, such as those disclosed in U.S. Pat. Nos. 4,329,384 and 4,330,590, both incorporated herein by reference, e.g., 2,4-bis (trichloromethyl)-6-p-methoxystyrene-S-triazine and the chromophore halomethyl-S-triazines. Additional useful crosslinking agents include mono-ethylenically unsaturated aromatic ketones, particularly 4-acryloxybenzophenone, as described in U.S. Pat. No. 4,737,559, incorporated herein by reference and multifunctional crosslinking agents, such as 1,5-bis(4-benzoylbenzoxy)pentane, as described in PCT Patent Appl. WO 97/07161, and 1,4-butanedi[4-benzoylphenoxy]acetate, as described in U.S. Pat. No. 5,407,971.

Crosslinking agents useful in solution, emulsion and suspension polymerized base copolymer compositions are those which are free radically copolymerizable and/or which effect crosslinking through exposure to radiation, moisture or heat following polymerization of the base copolymer. Typically, to maintain processibility and coatability of the plasticized pressure sensitive adhesive composition, crosslinking occurs following the compounding of the base copolymer with the plasticizing agent and coating of the plasticized mixture. Such crosslinkers include the above mentioned photoactive substituted triazines, multifunctional benzophenone crosslinking agents and mono-ethylenically unsaturated aromatic ketones. Hydrolyzable, free radically copolymerizable crosslinkers, such as mono-ethylenically unsaturated mono-, di- and trialkoxy silane compounds including but not limited to methacryloxypropyl trimethoxysilane (sold under the tradename "Silane A-174" by Union Carbide Chemicals and Plastics Co.), vinyldimethylethoxysilane, vinylmethyldiethoxysilane, vinyltriethoxysilane, vinyltrimethoxysilane, vinyltriphenoxysilane, and the like are also useful crosslinkers. Heat activated copolymerizable crosslinking agents, including but not limited to N-methylol acrylamide and acrylamido glycolic acid, can also be used to enhance the shear strength of the pressure-sensitive adhesive composition of the invention.

Ionic crosslinking methods can also be used. Examples of these include the simple addition of multifunctional metal ions, such as for example zirconium acetate (available from Magnesium Elektron Ltd., Flemington, N.J., USA); or the compounding with polymeric basic crosslinkers as disclosed in U.S. patent application Ser. No. 09/025,607, assigned to 3M Company.

Other Additives

Other additives can be included in the polymerizable mixture or added at the time of compounding or coating to change the properties of the pressure sensitive adhesive. Such additives, include pigments, tackifiers, fillers such as glass or polymeric bubbles or beads (which may be expanded or unexpanded), hydrophobic or hydrophilic silica, calcium carbonate, glass or synthetic fibers, blowing agents, toughening agents, reinforcing agents, fire retardants, antioxidants, and stabilizers. The additives are added in amounts sufficient to obtain the desired end properties.

Polymerization Methods

In the practice of the invention, the base copolymers can be polymerized by techniques including, but not limited to, the conventional techniques of solvent polymerization, dispersion polymerization, emulsion polymerization, suspension polymerization, solventless bulk polymerization, and radiation polymerization, including processes using ultraviolet light, electron beam, and gamma radiation. The starting materials may comprise a polymerization initiator, especially a thermal initiator or a photoinitiator of a type and in an amount effective to polymerize the comonomers of the base copolymer.

Solvent Polymerization Method

Solvent polymerization is well known in the art and described in various sources such as U.S. Pat. Nos. Re 24,906, and 4,554,324. Briefly, the procedure is carried out by adding the monomers, a suitable solvent such as ethyl acetate, and an optional chain transfer agent to a reaction vessel, adding a free radical initiator, purging with nitrogen, and maintaining the reaction vessel at an elevated temperature, typically in the range of about 40° to 100° C. until the reaction is completed, typically in about 1 to 20 hours, depending upon the batch size and temperature. Optionally, the plasticizing agents used in the compositions of this invention can be present during the solution polymerization process, in which case they can replace part or all of the solvent used. Suitable free radical initiators are commercially available such as those available from DuPont Company under the VAZO trade name designation. Specific examples include VAZO 64 (2,2'-azobis(isobutyroniltrile) and VAZO 52. Suitable initiators also include hydroperoxides, such as tert-butyl hydroperoxide, and peroxides, such as benzoyl peroxide and cyclohexane peroxide. The plasticizing agent can be added either to the monomers before solvent polymerization as described above, or it can be added to the non-tacky base copolymer solution after polymerization.

Dispersion Polymerization Method

Dispersion polymerization typically is carried out as single-phase reaction mixture consisting of a solution of monomers, initiator and steric stabilizer in a solvent that does not dissolve the resulting polymer. The initial stage of the polymerization is a typical solution polymerization and the polymer chains grow in size until they become insoluble in the reaction mixture. As the polymer starts to precipitate out of the mixture, the steric stabilizer adsorbs on the surface of the polymer preventing coalescence of the polymer particles as they form. The reaction will continue until all the monomer is consumed resulting in the formation of polymer particles insoluble in the reaction medium they were formed in.

Emulsion Polymerization Method

Emulsion polymerization is also described in U.S. Pat. No. Re 24,906 in which the monomers are added to distilled water with an emulsifying agent and suitable initiators in a reaction vessel, purged with nitrogen, and heated with agitation, typically to a temperature in the range of about 25° to 80° C., until the reaction is completed. Again, the plasticizing agent can be added either to the monomers before polymerization, or it can be added to the non-tacky base copolymer mixture after polymerization.

For ease of handling and/or to employ emulsion polymerized base copolymers as solid materials or coatable, dispersible powders, the emulsion polymerized base copolymer can be spray dried using conventional drying techniques. To prepare such powders, the emulsion polymerized base copolymer can be fed to a nozzle that sprays the emulsion into a stream of hot gas. The aqueous emulsion medium evaporates first, forming a small droplet of concentrated base copolymer. As aqueous medium removal nears completion, the droplet is transformed into a powder particle. See for example, U.S. Pat. No. 3,772,262 or K. Masters, "Spray Drying", 2nd ed., Wiley: 1976.

Suspension Polymerization Method

The base copolymer can also be prepared in bead form using suspension polymerization methods. Such suspension methods are described, for example, in European Patent Appl. No. 853092 (assigned to 3M Company). This suspension process involves mixing the high Tg comonomers, low Tg (meth)acrylate comonomers, optional acidic comonomers, free radical initiator, and chain transfer agent and other desired additives to form a premix. A suspension stabilizer such as dextrin or a dextrin derivative is combined with water and then with the premix to form a oil in water suspension. The resulting suspension typically comprises from about 10 to about 50 weight percent premix and from about 90 to about 50 weight percent water phase. Polymerization is then initiated, typically thermally, and carried out for about 2 to about 16 hours at a temperature between about 40° C. and 90° C. The base copolymer beads can be isolated by a variety of means and generally have a diameter of 1 to 5000 microns. Similar to the emulsion process, smaller particles can be spray-dried to recover the non-tacky base polymer. Larger particles can be isolated, for example, by simple filtration and air-dried.

After isolating from suspension and drying, the suspension beads can show some blocking possibly resulting from the cold flow of the beads, even though the Tg of the base copolymer beads is above 0° C. Due to this blocking, the suspension beads can partially or even completely lose their free-flowing characteristics. To prevent this loss of flow, a dusting agent such as hydrophobic silica (such as AEROSIL R-972, commercially available from Degussa) can be added immediately after isolating the beads. When treated in this manner, suspension beads can also be used in processing methods and delivery techniques that advantageously exploit the powder-like nature of these materials.

Solventless Polymerization Processes

Solventless polymerization methods, such as the continuous free radical polymerization method described in U.S. Pat. Nos. 4,619,979 and 4,843,134; the essentially adiabatic polymerization methods using a batch reactor described in U.S. Pat. No. 5,637,646; and, the methods described for polymerizing packaged pre-adhesive compositions described in U.S. Pat. No. 5,804,610 may also be utilized to prepare the polymers.

In one preferred embodiment of this latter method, from 0.1 to 500 grams of the polymerizable mixture comprising high Tg monomers and low Tg (meth)acrylate monomers, optional acidic comonomers, plasticizing agent, initiator, and optional chain transfer agent is completely surrounded by a packaging material. In another preferred embodiment, the pre-adhesive composition is disposed on the surface of a sheet, or between a pair of two substantially parallel sheets of the packaging material.

The packaging material is made of a material that when combined with the base copolymer or plasticized pressure sensitive adhesive composition does not substantially adversely affect the desired pressure sensitive adhesive characteristics. A hot melt coated pressure sensitive adhesive produced from a mixture of the pressure sensitive adhesive and the packaging material may have improved pressure sensitive adhesive properties compared to hot melt coated pressure sensitive adhesive produced from pressure sensitive adhesive alone.

The packaging material should be appropriate for the polymerization method used. For example, with photopolymerization, it is necessary to use a film material that is sufficiently transparent to ultraviolet radiation at the wavelengths necessary to effect polymerization. Polymerization can be effected by exposure to ultraviolet (UV) radiation as described in U.S. Pat. No. 4,181,752. In a preferred embodiment, the polymerization is carried out with UV black lights having over 60 percent, and preferably over 75 percent of their emission spectra between 280 to 400 nanometers (nm), with an intensity between about 0.1 to about 25 mW/cm$^2$.

In another preferred solventless polymerization method, the plasticized pressure sensitive adhesives of the present invention are prepared by photoinitiated polymerization methods according to the technique described in U.S. Pat. No. 4,181,752, hereby incorporated by reference. The high Tg comonomer, low Tg (meth)acrylate comonomer, optional acidic comonomer, plasticizing agent and a photoinitiator are mixed together in the absence of solvent and partially polymerized to a viscosity in the range of from about 500 cps to about 50,000 cps to achieve a coatable syrup. Alternatively, the monomers and photoinitiator are mixed in the absence of solvent and partially polymerized to a make syrup. The plasticizing agent is then added to the syrup to make a coatable mixture for further polymerization. In yet another way, the monomers, and plasticizing agent may be mixed with a thixotropic agent such as fumed hydrophilic silica to achieve a coatable thickness. The crosslinking agent and any other ingredients are then added to the prepolymerized syrup or thickened plasticized monomer mixture. Alternatively, these ingredients (with the exception of the crosslinking agent) can be added directly to the monomer mixture prior to pre-polymerization.

The resulting composition is coated onto a substrate (which may be transparent to ultraviolet radiation) and polymerized in an inert (i.e., oxygen free) atmosphere, e.g., a nitrogen atmosphere by exposure to ultraviolet radiation. Examples of suitable substrates include release liners (e.g., silicone release liners) and tape backings (which may be primed or unprimed paper or plastic). A sufficiently inert atmosphere can also be achieved by covering a layer of the polymerizable coating with a plastic film which is substantially transparent to ultraviolet radiation, and irradiating through that film in air as described in the aforementioned patent using ultraviolet lamps. Alternatively, instead of covering the polymerizable coating, an oxidizable tin compound may be added to the polymerizable syrup to increase the tolerance of the syrup to oxygen as described in U.S. Pat. No. 4,303,485. The ultraviolet light source preferably has 90% of the emissions between 280 and 400 nm (more preferably between 300 and 400 nm), with a maximum at 351 nm.

Methods of Coating

Solvent coating:

Any conventional coating technique can be used to apply the plasticized pressure sensitive adhesive compositions to target substrates from solvent solutions. Useful coating techniques include brush, roll, spray, spread, wire, gravure, transfer roll, air knife, or doctor blade coating.

The plasticized pressure sensitive adhesive composition can be applied to any suitable substrate that can be a sheet, a fiber, or a shaped article. However, the preferred substrates are those used for pressure-sensitive adhesive products. The plasticized pressure sensitive adhesive composition can be applied to at least one major surface of suitable flexible or inflexible backing materials before crosslinking is initiated. Useful flexible backing materials include, for example, paper, plastic films such as polypropylene, polyethylene, polyvinylchloride, polytetrafluoroethylene, polyvinylchloride, polyester, polyethylene terephthalate, cellulose acetate, ethyl cellulose, and the like.

Backings may also be constructions with irregular surfaces, such as woven fabric, nonwoven fabric, paper, or other materials having rough surfaces. Such woven fabrics can be formed from threads of synthetic or natural materials (e.g., cotton, nylon, rayon, glass, or ceramic material). Such nonwoven fabrics include air-laid webs of natural or synthetic fibers or blends of these, if the webs are not too porous to prevent substantial migration of the coating material into the backing material. Due to its high porosity, paper itself is usually not suitable unless heavier coatings of greater than one micrometer are applied in an effort to offset coating material soaking into the paper. However, glassine, plastic-coated, or impregnated paper is suitable. Other materials having rough surfaces include those having embossed or patterned surfaces and particle-impregnated resins, such as abrasive particle-covered resins (e.g., epoxy resins) and glass bead-covered resins. Many of these backings are commonly used in pavement marking tapes. In addition, suitable backings can be formed of metal, metallized polymeric film, natural or synthetic rubber, or ceramic sheet material. Primers can be used, but are not necessary.

The coating thickness will vary depending upon various factors such as, for example, the particular application, the coating formulation, and the nature of the substrate (e.g., its absorbency, porosity, surface roughness, crepe, chemical composition, etc.). Typically, a porous substrate or a rough surface will require a thicker coating than less porous substrates or smoother surfaces. Pressure-sensitive adhesive coatings typically will have a thickness between about 25 and about 250 microns.

Hot Melt coating:

The plasticized pressure sensitive adhesive compositions may be used to make a coatable thermoplastic hot melt pressure sensitive adhesive by introducing the base copolymer, plasticizing agent and other optional additives into a vessel in which the mixture is compounded and melted. This plasticized hot melt pressure sensitive adhesive may be used to form a pressure sensitive adhesive sheet by coating the melted pressure sensitive adhesive onto a sheet material or another suitable substrate. The sheet material is preferably selected from a tape backing, a film backing, or a release liner. Preferably, the plasticized pressure sensitive adhesives are hot melt coated by putting the base copolymer and plasticizing agent in a hot melt coater at a temperature sufficient to melt and thoroughly mix the components to make the pressure-sensitive adhesive, which is coated onto a substrate. This step can be done conveniently in a heated extruder, bulk tank melter, melt-on-demand equipment, or a hand-held hot melt adhesive gun. Unlike tackifiers that typically require melting before feeding an extruder, plasticizing agents are typically pumpable without heating. Advantageously, the properties of the compounded pressure-sensitive adhesive can be adjusted by simply adjusting the metering ratio of the base polymer to plasticizing agent feedstreams.

The coatable plasticized thermoplastic hot melt pressure sensitive adhesive can be delivered out of a film die and subsequently coated by contacting the drawn adhesive with a moving plastic web or other suitable substrate. A related coating method involves extruding the coatable plasticized thermoplastic hot melt pressure sensitive adhesive and a coextruded backing material from a film die and cooling the layered product to form a pressure sensitive adhesive tape. Other forming methods involve directly contacting the coatable plasticized thermoplastic hot melt pressure sensitive adhesive to a rapidly moving plastic web or other suitable preformed substrate. Using this method, the plasticized pressure sensitive adhesive blend is applied to the moving preformed web using a die having flexible die lips, such as a rotary rod die. After forming by any of these continuous methods, the pressure sensitive adhesive films or layers can be solidified by quenching using both direct methods (e.g., chill rolls or water baths) and indirect methods (e.g., air or gas impingement).

The steps may be done in-line, i.e., the base copolymer can be polymerized, compounded with a plasticizing agent, hot melt coated to form a tape, and optionally crosslinked, or the steps may be performed individually at separate times and sites. For example, the base copolymer can be compounded with the plasticizing agent at one time, and extruded and crosslinked at another time.

Powder coating:

One of the advantages of using the plasticized pressure sensitive adhesive mixtures of the present invention is the ability to deliver the base copolymer or mixtures of the base copolymer and a solid, powdered plasticizing agent using powder coating techniques. In addition to the spray dried emulsion base copolymers and the free-flowing suspension or dispersion polymerized particles described above, the base copolymer in powdered form can also be prepared using mechanical techniques such as cryo-grinding or hammer milling. Solid, powdered plasticizing agents can be prepared using similar mechanical methods.

This capability to deliver the base copolymer or base copolymer/plasticizing agent mixtures as powdered coatings offers several advantages and alternatives over pressure sensitive adhesives coated using conventional techniques. When used to deliver pressure sensitive adhesive coatings to a moving substrate or web, traditional hot melt pressure sensitive adhesive coating techniques can introduce a thermal and shear history to the molten mixture prior to coating and an orientation effect to the coated polymer. These process-related effects can compromise the performance of hot-melt coated pressure sensitive adhesives. Hot-melt coating also has its limitations when three dimensional or rough surfaces coverage is required. Finally, coating of wide sheets or substrates requires bulky and expensive custom coating dies that are not readily available.

By using powder coating techniques to coat all or a portion of a substrate surface with the plasticized pressure sensitive adhesive mixture of the present invention, all of these disadvantages associated with hot melt coated pressure sensitive adhesive materials can be avoided. In one embodiment of the invention, a mixture of a powdered high Tg base copolymer and a powdered, plasticizing agent is powder coated onto all or a portion of a substrate. The powder coating is then exposed to sufficient heat to melt the plasticizing agent, allowing it to absorb into and modify the Tg and shear storage modulus of the base copolymer to form a pressure sensitive adhesive material. The heat source can be diffuse so to activate broad areas of the powdered pressure sensitive adhesive coating or focused to activate on discrete, predetermined portions of the powdered coating. Dependant on the rheology and crosslink density of the base polymer particles, the heat can fuse the coating into a smooth pressure-sensitive adhesive coating, or all or part of the particle character of the base polymer can be maintained.

Another embodiment of the invention involves the initial coating of a powdered base copolymer to all or a portion of a substrate. All or a portion of the powdered base copolymer coating can then be activated to a material having pressure sensitive adhesive properties by introducing a liquid plasticizing agent by means of spray, flood or other liquid delivery techniques (such as ink jet) to the areas of the powdered base copolymer coating. Thus, patterned layers can be created by spraying of the liquid plasticizing agent over the powdered base copolymer. Alternatively, patterned layers can be created by heating the powdered base copolymer overlaid with solid plasticizer(powder or film) with a focused heating source, such as an IR laser, or a diffuse heating source using a patterned mask or overlay. The powdered base copolymer may be partially or completely fused into a smooth coating prior to the application of the plasticizing agent.

An additional advantage associated with these powder coating processes, wherein only a portion of the base copolymer powder coating is plasticized, is the ability to readily remove the unplasticized particles from the substrate. Once removed from the substrate, the plasticized pressure-sensitive material remains and the unactivated base copolymer particles can be recycled for future use. Other methods conventionally used for delivering or creating patterned pressure sensitive adhesive coated articles, such as hot-melt spray or screen-printing, can lead to adhesive materials that cannot be reused.

Similar to coatings prepared using these powder coating techniques; hot melt or solvent coated base copolymer films can be selectively activated to exhibit pressure-sensitive adhesive properties using the heat activation of solid plasticizer or liquid plasticizing agent by activation methods described above.

Additionally, unplasticized base copolymer particles or films can be coated with a solid plasticizer in the form of a powder, film, particles and the like, heated to a temperature sufficient to melt the plasticizer and activate the pressure sensitive properties of the combined base copolymer film and the plasticizer.

Yet, another advantage of powder format of the base polymer is the ease of blending the base polymer with other powdered components. The powdered components may be other base copolymers of the current invention with different composition or molecular weight, which when plasticized yield pressure-sensitive adhesives. Alternatively, the powdered components can be other polymeric or inorganic materials which when plasticized yield composite materials bonded together through the plasticized polymer composition of the current invention.

Useful techniques for powder coating of the base copolymer or plasticized pressure sensitive adhesive mixtures include fluidized-bed coating and electrostatic spray processes. In the fluidized-bed coating process, the powdered material is placed in a container having a porous plate as its base. Air is passed through the plate, causing the powder to expand in volume and fluidize. In this state, the powder possesses some of the characteristics of a fluid. The substrate is heated in an oven to a temperature above the melting point of the powder and dipped into the fluidized bed where the particles melt on the surface to form a coating. Alternatively, the cold substrate can be run over a bed of fluidized particles that are tribo-charged and cling to the web. The powder-coated substrate can then be run through a heated zone or nip to fuse the particles. In the electrostatic spray process the powdered material is dispersed in an air stream and passed through a corona discharge field where the particles acquire an electrostatic charge. The charged particles are attracted to and deposited on the grounded substrate. The substrate, usually electrostatically coated at room temperature, is then placed in an oven where the powder melts and forms a coating. See for example, Kirk-Othlmer Encyclopedia of Chemical Technology, $4^{th}$ Edition, Wiley: 1993, Vol. 6, pages 635–636.

In addition to a coating of plasticized pressure-sentitive adhesive onto a substrate, as described above, other conventional coatings, such as a low adhesion backsize, primer coating and the like can be coated on the substrate. Such coatings are known to those skilled in the art and are indicative of the intended use of the coated sheet materials. Furthermore, substrates may be pretreated prior to use. Plasticized pressure-sensitive adhesive coated sheet materials can take the form of any article conventionally known to be utilized with known PSA compositions, such as labels, tapes, transfer tapes (comprising a film of the PSA borne on at least one release liner), signs, covers, marking indices, and the like.

This invention is further illustrated by the following examples that are not intended to limit the scope of the invention. In the examples, all parts, ratios and percentages are by weight unless otherwise indicated. The following test methods were used to evaluate and characterize the plasticized acrylate-based pressure sensitive adhesives compositions produced in the examples. All materials are commercially available, for example from Aldrich Chemicals (Milwaukee, Wis.), unless otherwise indicated or described.

EXAMPLES

Test Methods

Prior to testing, all samples were conditioned for about 24 hours in a constant temperature (23° C.), constant humidity (50% relative humidity) environment. Unless specified, the peel adhesion test and the shear strength test were performed under the same atmospheric conditions.

Peel Adhesion

Peel adhesion is the force required to remove an adhesive-coated, flexible sheet material from a test panel. Peel adhesion is measured at a specific angle and rate of removal. In the following examples, this peel adhesion force is expressed in Newtons/decimeter width (N/dm) of the coated sheet.

The procedure followed was:

A strip (1.27 centimeter wide) of the adhesive-coated sheet was applied to the horizontal surface of a clean glass test plate with at least 5 lineal centimeter of both surfaces being in firm contact. One pass with a 2-kilogram hard rubber roller was used to apply the strip. The free end of the coated strip was doubled back nearly touching itself so the angle of removal was 180°. The free end was attached to the adhesion tester scale. The glass test plate was clamped in the jaws of a tensile testing machine that was capable of moving the plate away from the scale at a constant rate of 30 centimeters/minute or 2.3 meters/minute. The scale reading was recorded in Newtons as the tape was peeled from the glass surface. The data was reported as the average of the range of numbers observed during the test.

Shear Strength

Shear strength is a measure of the cohesiveness, or internal strength, of an adhesive. Shear strength is based upon the amount of force required to pull an adhesive strip (tape) from a standard flat surface in a direction parallel to the surface to which it has been affixed with a definite pressure. Shear strength was measured as the time, in minutes, required to pull a standard area of adhesive-coated sheet material from a stainless steel test panel under the stress of a constant, standard load. This test followed the procedure described in ASTM D 3645M-88: "Holding Power of Pressure-sensitive Adhesive Tapes."

The tests were conducted at room temperature (about 22° C. to about 25° C.) on strips of adhesive-coated sheet material applied to a stainless steel panel. A 1.27 centimeter square portion of each strip was in firm contact with the panel and one end portion of the tape was free. The panel, with the adhesive-coated strip attached, was held in a rack such that the panel formed an angle of 178° with the extended free end of the adhesive-coated strip. The free end was tensioned by applying a force of 1,000 grams to the free end of the adhesive-coated strip. An angle of 2° less than 180° was used in order to negate any peel forces. Thus, only shear forces were measured. The elapsed time for each adhesive-coated strip to separate from the test panel was recorded as the shear strength. The test was discontinued after 10,000 minutes. Failures were noted as adhesive (no residue on panel) of cohesive (adhesive failed internally and adhesive residue remained on both backing and panel).

| Glossary | |
|---|---|
| 7050 | PLASTHALL 7050, a dialkyl ether glutarate plasticizing agents (commercially available from C.P. Hall, Co.) |
| AA | acrylic acid |
| ABP | 4-acryloxy benzophenone copolymerizable photocrosslinker |
| BA | n-butyl acrylate |
| BENZOFLEX 9-88 | a dipropylene glycol 200 dibenzoate plasticizing agent (commercially available from Velsicol Chemical Co.) |
| BENZOFLEX P-200 | a polyethylene glycol 200 dibenzoate plasticizing agent (commercially available from Velsicol Chemical Co.) |
| CHMA | cyclohexyl methacrylate |
| DIODD | PLASTHALL DIODD, a diisooctyl dodecanedioate plasticizing agent (commercially available from C.P. Hall, Co.) |
| DOA | dioctyl adipate plasticizing agent |
| ESACURE KB-1 | 2,2-dimethoxy-1,2-diphenyl-1-ethanone photoinitiator (commercially available from Sartomer Co.) |
| IBA | isobornyl acrylate |
| IOA | isooctyl acrylate |
| IOTG | isooctyl thioglycolate |
| MA | methyl acrylate |
| MAA | methacrylic acid |
| MMA | methyl methacrylate |
| pph | parts per hundred |
| PYCAL 94 | a phenyl ether of polyethylene oxide plasticizing agent (commercially available from ICI Chemicals, Inc.) |
| RX-13290 | a polyester adipate plastizer (commercially available form C.P. Hall, Co.) |
| SANTICIZER 97 | a dialkyl phthalate plasticizing agent (commercially available from the Monsanto Co.) |
| SANTICIZER 141 | a 2-ethylhexyl diphenyl phosphate plasticizing agent (commercially available from the Monsanto Co.) |
| SANTICIZER 154 | a t-butylphenyl diphenyl phosphate plasticizing agent (commercially available from the Monsanto Co.) |
| SANTICIZER 160 | a butyl benzylphthalate plasticizing agent (commercially available from the Monsanto Co.) |
| SARTOMER SR650 | a dibutoxyethoxyethyl adipate plasticizing agent (commercially available from Sartomer, Co.) |
| SARTOMER SR660 | a dibutoxyethoxyethyl formal plasticizing agent (commercially available from Sartomer, Co.) |
| STY | styrene |
| TACKIDEX 035 | a dextrin suspension stabilizer (commercially available from Roquette Chemical) |
| VAZO 64 | azo-bis(isobutyronitrile) initiator (commercially available from E.I. duPont de Nemours & Co.) |

Examples 1–6

Plasticized PSA Compositions Containing Solution Polymerized Base Copolymer (45/10/45/0.2 BA/AA/IBA/ABP)

In a reaction vessel, 45 parts BA, 10 parts AA, 45 parts IBA, 0.2 parts ABP copolymerizable photocrosslinker, and 150 parts ethyl acetate were mixed. To this mixture, 0.3 parts VAZO 64 initiator was added. The bottle was then made inert with nitrogen gas and sealed. The sealed vessel was tumbled in a 55° C. water bath for 20 hours. After cooling to room temperature, the amounts of plasticizing agent specified in Table 1 were blended with 100 parts of the base copolymer.

These plasticized blends were knife coated onto a 38 μm thick primed poly(ethylene terephthalate) film and dried for 15 minutes at 65° C. to yield 25 μm thick pressure sensitive adhesive coatings. The coated samples were then cured by the use of a Fusion Systems UV processor using an "H" bulb at full power, exposing each sample to a total energy dose of about 80 mJ/cm². These cured samples were tested for peel adhesion and shear strength as described above. The results of these tests are recorded in Table 1.

TABLE 1

| Ex. | Base Copolymer (parts) | Plasticizing agent (parts) | Peel Adhesion[1] (N/dm) | Peel Adhesion[2] (N/dm) | Shear Strength (minutes) |
|---|---|---|---|---|---|
| 1 | BA/AA/IBA/ABP (45/10/45/0.2) | PYCAL 94 (9) | 25.4 | 49.0 | 10,000+ |
| 2 | BA/AA/IBA/ABP (45/10/45/0.2) | PYCAL 94 (23) | 37.0 | not measured | 10,000+ |
| 3 | BA/AA/IBA/ABP (45/10/45/0.2) | SANTICIZER 97 (9) | 53.4 | 74.2 | 10,000+ |
| 4 | BA/AA/IBA/ABP (45/10/45/0.2) | SANTICIZER 97 (23) | 42.7 | not measured | 10,000+ |
| 5 | BA/AA/IBA/ABP (45/10/45/0.2) | SANTICIZER 141 (9) | 31.5 | 90.8 | 10,000+ |
| 6 | BA/AA/IBA/ABP (45/10/45/0.2) | SANTICIZER 141 (23) | 66.5 | not measured | 10,000+ |

[1]peel adhesion measured at 30 centimeters/minute peel rate
[2]peel adhesion measured at 2.3 meters/minute peel rate Examples 7–12

Plasticized PSA Compositions Containing Solution Polymerized Base Copolymer (40/10/50/0.2 BA/AA/IBA/ABP)

Plasticized acrylate PSA compositions were prepared, coated, cured and tested as described above in Examples 1–6, except that the base copolymer component comprised 40 parts BA, 10 parts AA, 50 parts IBA, and 0.2 parts ABP copolymerizable photocrosslinker. The plasticized acrylate PSA formulations and the results of these tests are recorded in Table 2.

TABLE 2

| Ex. | Base Copolymer (parts) | Plasticizing agent (parts) | Peel Adhesion[1] (N/dm) | Peel Adhesion[2] (N/dm) | Shear Strength (minutes) |
|---|---|---|---|---|---|
| 7 | BA/AA/IBA/ABP (40/10/50/0.2) | PYCAL 94 (9) | 18.2 | 47.1 | 10,000+ |
| 8 | BA/AA/IBA/ABP (40/10/50/0.2) | PYCAL 94 (23) | 34.8 | not measured | 10,000+ |
| 9 | BA/AA/IBA/ABP (40/10/50/0.2) | SANTICIZER 97 (9) | 28.2 | 77.7 | 10,000+ |
| 10 | BA/AA/IBA/ABP (40/10/50/0.2) | SANTICIZER 97 (23) | 51.0 | not measured | 10,000+ |
| 11 | BA/AA/IBA/ABP (40/10/50/0.2) | SANTICIZER 141 (9) | 9.2 | not measured | not measured |
| 12 | BA/AA/IBA/ABP (40/10/50/0.2) | SANTICIZER 141 (23) | 67.2 | not measured | 10,000+ |

[1]peel adhesion measured at 30 centimeters/minute peel rate
[2]peel adhesion measured at 2.3 meters/minute peel rate Examples 1–12 illustrate that useful pressure-sensitive adhesives can be formulated out of otherwise non-tacky base copolymers. Different classes of plasticizing agents show different performance in the same base polymer. The relatively low levels of plasticizing agent used in these examples allow for efficient photocrosslinking of the adhesive formulations and high cohesive strength is obtained for all examples.

Examples 13–16 and Comparative Example C1

Plasticized PSA Compositions Containing Solution Polymerized Base Copolymer (50/10/40/0.2 IOA/AA/IBA/ABP)

Plasticized acrylate PSA compositions were prepared, coated, cured and tested as described above in Examples 1–6, except that the base copolymer component comprised 50 parts IOA, 10 parts AA, 40 parts MBA, and 0.2 parts ABP copolymerizable photocrosslinker was cured by the use of a Fusion Systems UV processor using an "H" bulb at full power and a conveyor speed of 25 meters/min. (1 pass), exposing each sample to a total energy dose of about 150 mJ/cm². The plasticized acrylate PSA formulations and the results of these tests are recorded in Table3.

TABLE 3

| Ex. | Base Copolymer (parts) | Plasticizing agent (parts) | Peel Adhesion[1] (N/dm) | Shear Strength (minutes) |
|---|---|---|---|---|
| 13 | IOA/AA/IBA/ABP (50/10/40/0.2) | PYCAL 94 (3) | 65.7 | 10,000+ |
| 14 | IOA/AA/IBA/ABP (50/10/40/0.2) | PYCAL 94 (5) | 50.3 | 956 (cohesive) |
| 15 | IOA/AA/IBA/ABP (50/10/40/0.2) | PYCAL 94 (7) | 28.5 | 67 (cohesive) |
| 16 | IOA/AA/IBA/ABP (50/10/40/0.2) | PYCAL 94 (10) | 30.6 | 5 (cohesive) |

TABLE 3-continued

| Ex. | Base Copolymer (parts) | Plasticizing agent (parts) | Peel Adhesion[1] (N/dm) | Shear Strength (minutes) |
|---|---|---|---|---|
| C1 | IOA/AA/IBA/ABP (50/10/40/0.2) | PYCAL 94 (0) | 0.7 | Not Measurable |

[1]peel adhesion measured at 30 centimeters/minute peel rate

Examples 13–16 demonstrate that small amounts of an effective plasticizing agent can be added to an essentially non-tacky, non-pressure-sensitive adhesive base copolymer (Comparative Example C1) to radically and usefully transform its properties.

Examples 17–20 and Comparative Example C2

Plasticized PSA Compositions Containing Solution Polymerized Base Copolymer (50/10/40/0.2 BA/AA/IBA/ABP)

Plasticized acrylate PSA compositions were prepared, coated, cured and tested as described above in Examples 13–16 and Comparative Example C1, except that the base copolymer component comprised 50 parts BA, 10 parts AA, 40 parts IBA, and 0.2 parts ABP copolymerizable photocrosslinker. The plasticized acrylate PSA formulations and the results of these tests are recorded in Table 4.

TABLE 4

| Ex. | Base Copolymer (parts) | Plasticizing agent (parts) | Peel Adhesion[1] (N/dm) | Shear Strength (minutes) |
|---|---|---|---|---|
| 17 | BA/AA/IBA/ABP (50/10/40/0.2) | PYCAL 94 (3) | 63.5 | 10,000+ |
| 18 | BA/AA/IBA/ABP (50/10/40/0.2) | PYCAL 94 (5) | 41.6 | 759 (cohesive) |
| 19 | BA/AA/IBA/ABP (50/10/40/0.2) | PYCAL 94 (7) | 24.1 | 615 (cohesive) |
| 20 | BA/AA/IBA/ABP (50/10/40/0.2) | PYCAL 94 (10) | 13.1 | 21 (cohesive) |
| C2 | BA/AA/IBA/ABP (50/10/40/0.2) | PYCAL 94 (0) | 0.7 | Not Measurable |

[1]peel adhesion measured at 30 centimeters/minute peel rate

Examples 13–20 show that low levels of plasticizing agent are required to activate these non-tacky base copolymers (Comparative Examples C1 and C2) into a pressure-sensitive adhesives having good performance. It also demonstrates that, at higher levels of plasticizing agent with this type of copolymer, peel and shear can quickly diminish.

Examples 21–34

Plasticized PSA Compositions Containing Solution Polymerized Base Copolymer and Various Plasticizing agents (50/10/40/0.2 BA/AA/IBA/ABP)

Plasticized acrylate PSA compositions were prepared, coated, cured and tested as described above in Examples 17–20, except that the types and levels of plasticizing agents have been changed. The plasticized acrylate PSA formulations and the results of these tests are recorded in Table 5.

TABLE 5

| Ex. | Base Copolymer (parts) | Plasticizing agent (parts) | Peel Adhesion[1] (N/dm) | Shear Strength (minutes) |
|---|---|---|---|---|
| 21 | BA/AA/IBA/ABP (50/10/40/0.2) | SARTOMER SR650 (5) | 45.8 | 10,000+ |
| 22 | BA/AA/IBA/ABP (50/10/40/0.2) | SARTOMER SR650 (7) | 35.2 | 2,585 (cohesive) |
| 23 | BA/AA/IBA/ABP (50/10/40/0.2) | SARTOMER SR660 (5) | 40.7 | 10,000+ |
| 24 | BA/AA/IBA/ABP (50/10/40/0.2) | SARTOMER SR660 (7) | 26.9 | 1,360 (cohesive) |
| 25 | BA/AA/IBA/ABP (50/10/40/0.2) | BENZOFLEX 9-88 (5) | 62.2 | 3,697 (adhesive) |
| 26 | BA/AA/IBA/ABP (50/10/40/0.2) | BENZOFLEX 9-88 (7) | 52.1 | 10,000+ |
| 27 | BA/AA/IBA/ABP (50/10/40/0.2) | BENZOFLEX P-200 (5) | 53.4 | 690 (adhesive) |
| 28 | BA/AA/IBA/ABP (50/10/40/0.2) | BENZOFLEX P-200 (7) | 47.1 | 10,000+ |
| 29 | BA/AA/IBA/ABP (50/10/40/0.2) | DOA (5) | 52.8 | 10,000+ |
| 30 | BA/AA/IBA/ABP (50/10/40/0.2) | DOA (7) | 36.6 | 10,000+ |
| 31 | BA/AA/IBA/ABP (50/10/40/0.2) | SANTICIZER 97 (5) | 49.5 | 10,000+ |
| 32 | BA/AA/IBA/ABP (50/10/40/0.2) | SANTICIZER 97 (7) | 37.0 | 10,000+ |
| 33 | BA/AA/IBA/ABP (50/10/40/0.2) | SANTICIZER 141 (5) | 60.9 | 10,000+ |
| 34 | BA/AA/IBA/ABP (50/10/40/0.2) | SANTICIZER 141 (7) | 53.6 | 10,000+ |

[1]peel adhesion measured at 30 centimeters/minute peel rate

Examples 21–34 demonstrate, particularly when compared to Examples 14–20, that different plasticizing agents can be combined with the same base colymer to yield pressure sensitive adhesives having a range of performance.

Comparative Examples C3–C10

Plasticized PSA Compositions Containing Solution Polymerized Low Tg Acrylate Copolymers Plasticized acrylate PSA compositions were prepared, coated, and tested as described above in Examples 13–16, except that a low Tg acrylate component prepared from IOA/MA/ABP or BA/MA/ABP copolymers having inherent pressure sensitive adhesive properties was substituted for the base copolymer component of the present invention and the adhesive coatings were cured by the use of a Fusion Systems UV processor using an "H" bulb at full power and a conveyor speed of 25 meters/min. (3 passes), exposing each sample to a total energy dose of about 450 mJ/cm². The plasticized acrylate PSA formulations and the results of these tests are recorded in Table 6.

TABLE 6

| Ex. | Base Copolymer (parts) | Plasticizing agent (parts) | Peel Adhesion[1] (N/dm) | Shear Strength (minutes) |
|---|---|---|---|---|
| C3 | IOA/MA/ABP (65/35/0.2) | PYCAL 94 (0) | 46.2 | 544 (adhesive) |
| C4 | IOA/MA/ABP (65/35/0.2) | PYCAL 94 (5) | 4.8 | 451 (adhesive) |
| C5 | BA/MA/ABP (65/35/0.2) | PYCAL 94 (0) | 39.6 | |
| C6 | BA/MA/ABP (65/35/0.2) | PYCAL 94 (5) | 6.6 | 659 (adhesive) |
| C7 | IOA/MA/ABP (55/45/0.2) | PYCAL 94 (0) | 54.4 | 10,000+ |
| C8 | IOA/MA/ABP (55/45/0.2) | PYCAL 94 (5) | 4.2 | 7839 (adhesive) |
| C9 | BA/MA/ABP (55/45/0.2) | PYCAL 94 (0) | 47.1 | 10,000+ |
| C10 | BA/MA/ABP (55/45/0.2) | PYCAL 94 (5) | 9.9 | 10,000+ |

[1]peel adhesion measured at 30 centimeters/minute peel rate

Comparative Examples C3–C10 illustrate that the presence of even as little as 5 parts per hundred of a plasticizing agent will reduce the peel performance of an inherently pressure-sensitive adhesive, low Tg acrylate copolymer significantly.

Examples 35–37 and Comparative Example C11

Plasticized PSA Compositions Prepared Using Solventless, UW Polymerization Method (45/10/45 IOA/AA/IBA)

UV polymerized plasticized pressure sensitive adhesives were prepared by the following method:

A pre-polymerized syrup was prepared by mixing 45 parts IOA, 45 parts IBA, 10 parts AA, and 0.04 part ESCACURE KB-1 in a closed container and purging with nitrogen. As the nitrogen purging continued, the composition was irradiated with an ultraviolet black light (40 Watt UV Sylvania BLACKLIGHT, commercially available from Osram Sylvania; Danvers, Mass.) to form a syrup having a coatable Brookfield viscosity estimated to be about 3000 centipoise. To the syrup was added an additional 0.1 part ESCACUR KB-1, 0.08 part 1,6-hexanedioldiacrylate crosslinking agent and the amount and type of plasticizing agent specified in Table 7.

After mixing, the plasticized syrup was knife coated to a thickness of about 75 μm on a transparent polyester film having a thickness of 37 μm and the exposed coating surface covered with a second siliconized polyester film. The laminated structure was then exposed a UV dosage of about 450 mJ/cm² using fluorescent black lamps having 90% of the emission spectra between 300 and 400 nm with a maximum at about 350 nm. Following exposure, the siliconized polyester film was removed and the cured samples were tested for peel adhesion and shear strength as described above. The results of these tests are recorded in Table7.

TABLE 7

| Ex. | Base Copolymer (parts) | Plasticizing agent (parts) | Peel Adhesion[1] (N/dm) | Shear Strength (minutes) |
| --- | --- | --- | --- | --- |
| 35 | 100 | SANTICIZER 141 (15) | 13.4 | 10,000+ |
| 36 | 100 | SANTICIZER 141 (30) | 103.4 | 4,072 coh |
| 37 | 100 | SANTICIZER 141 (45) | 73.1 | 433 coh |
| C11 | 100 | 0 | 0 | 0 |

[1]peel adhesion measured at 30 centimeters/minute peel rate

Examples 38–43

Plasticized PSA Compositions Containing Suspension Polymerized Base Copolymer (35/10/55/0.2 BA/AA/IBA/ABP)

A suspension polymerized base copolymer was prepared according to the method described in European Pat. Appl. No. EP 853092 (assigned to Minnesota Mining & Manufacturing Co.) with the following modifications:

The reaction was carried out in a two liter split flask equipped with condenser, thermowell, nitrogen inlet, stainless steel, motor-driven agitator, and a heating mantle with temperature control. The reaction flask was first charged with 150 parts of deionized water to which were added 0.6 parts of TACKIDEX 035 dextrin stabilizer. The reactor was heated to 45° C. and maintained at this temperature with agitation while purging with nitrogen. At this point a premixed charge of 35 parts IOA, 55 parts IBA, 10 parts AA, 0.2 part ABP, 0.023 part IOTG chain transfer agent, 0.3 part of VAZO 52 initiator, 0.08 part sodium thiosulfate water soluble inhibitor was added to the reactor while stirring vigorously at a rate between about 600 and 750 rpm. The temperature of the reaction mixture was adjusted to 55° C. and the reaction was continued with nitrogen purging until completion. The resulting non-tacky suspension polymerized copolymer beads were collected by filtration and were air dried.

A 40% by weight solids solution of the dried beads was formed by dissolving the beads in ethyl acetate. To this solution, the amount of SANTICIZER 141 plasticizing agent specified in Table 8 was added and the plasticized solution was then coated onto a 37 micrometer primed polyester film. The coated film was oven dried, resulting an adhesive coating thickness of 25 microns. The dried coated samples were cured using medium pressure mercury lamp high intensity UV lights at the dosages listed in Table 8 and tested for peel adhesion and shear strength as described above. To assess the aging characteristics of these plasticized PSA formulations, peel adhesion and shear strength testing was also performed following open face oven aging of the samples for 3 days at 70–75° C. The results of these tests are found in Table 8.

TABLE 8

| Ex. | Base Copolymer (parts) | Plasticizing agent (parts) | UV Dose (mJ/cm$^2$) | Peel Adhesion[1] (N/dm) | Aged Peel Adhesion[1] (N/dm) | Shear (min.) | Aged Shear (min.) |
| --- | --- | --- | --- | --- | --- | --- | --- |
| 38 | BA/AA/IBA/ABP (35/10/55/0.2) | SANTICIZER 141 (20) | 300 | 63.5 | 58.2 | 1844 (adhesive) | 10,000+ |
| 39 | BA/AA/IBA/ABP (35/10/55/0.2) | SANTICIZER 141 (20) | 450 | 61.3 | 56.9 | 1822 (adhesive) | 10,000+ |
| 40 | BA/AA/IBA/ABP (35/10/55/0.2) | SA and NTICIZER 141 (20) | 600 | 38.5 | 46.4 | 4125 (adhesive) | 4129 (adhesive) |
| 41 | BA/AA/IBA/ABP (35/10/55/0.2) | SANTICIZER 141 (25) | 300 | 54.9 | 49.3 | 1265 (cohesive) | 10,000+ |
| 42 | BA/AA/IBA/ABP (35/10/55/0.2) | SANTICIZER 141 (25) | 450 | 53.2 | 50.3 | 10,000+ | 10,000+ |
| 43 | BA/AA/IBA/ABP (35/10/55/0.2) | SANTICIZER 141 (25) | 600 | 34.4 | 38.3 | 980 (adhesive) | 895 (adhesive) |

[1]peel adhesion measured at 30 centimeters/minute peel rate

Examples 38–43 clearly demonstrate that aging of the plasticized PSA formulations does not have a significant detrimental effect on the performance of these materials. These examples also show that the suspension polymerized non-tacky base copolymer can be plasticized to make useful pressure-sensitive adhesives with balanced peel adhesion and shear strength performance.

Examples 44–48

Plasticized PSA Compositions Containing Suspension Polymerized Base Copolymer (45/10/45/0.2 BA/AA/MMA/ABP)

Plasticized acrylate PSA compositions were prepared, coated, cured and tested as described above in Examples 38–43, except that the suspension polymerized base copolymer comprised 45 parts IOA, 10 parts AA, 45 parts MMA, and 0.2 parts ABP copolymerizable photocrosslinker. The plasticized acrylate PSA formulations and the results of these tests are recorded in Table 9.

polyester backing (primed with an aminated polybutadiene) was laminated to the open face of the coating and the laminated structure was UV crosslinked at the dosages

TABLE 9

| Ex. | Base Copolymer (parts) | Plasticizing agent (parts) | UV Dose (mJ/cm$^2$) | Peel Adhesion[1] (N/dm) | Aged Peel Adhesion[1] (N/dm) | Shear (min.) | Aged Shear (min.) |
|---|---|---|---|---|---|---|---|
| 44 | IOA/AA/MMA/ABP (45/10/45/0.2) | SANTICIZER 141 (35) | 450 | 39.8 | 38.3 | 2586 (adhesive) | 2141 (adhesive) |
| 45 | IOA/AA/MMA/ABP (45/10/45/0.2) | SANTICIZER 97 (35) | 300 | 37.7 | 34.1 | 181 (cohesive) | Not measured |
| 46 | IOA/AA/MMA/ABP (45/10/45/0.2) | SANTICIZER 97 (35) | 450 | 39.2 | 37.2 | 140 (cohesive) | Not measured |
| 47 | IOA/AA/MMA/ABP (45/10/45/0.2) | SANTICIZER 160 (35) | 300 | 47.1 | 44.9 | 278 (cohesive) | 274 (cohesive) |
| 48 | IOA/AA/MMA/ABP (45/10/45/0.2) | SANTICIZER 160 (35) | 450 | 47.7 | 46.4 | 479 (cohesive) | Not measured |

[1]peel adhesion measured at 30 centimeters/minute peel rate

Examples 49–60

Hot Melt Compounded Plasticized PSA Compositions Containing Suspension Polymerized Base Copolymer (35/10/55/0.2 BA/AA/IBA/ABP)

As a preliminary step, the dried suspension polymerized base copolymer beads of Examples 44–48 (35/10/55/0.2 BA/AA/IBA/ABP) were tumble dried and stabilized with 0.25 AEROSIL R-972 hydrophobic silica for better handling and long term stability.

The silica coated beads were extrusion compounded with a variety of plasticizing agents using an 18 millimeter diameter, co-rotating twin screw LEISTRITZ extruder having a 40:1 length:diameter ratio and eight zones (available from leistritz Corporation; Allendale, N.J.) operating at 250 rpm. The temperatures of the zones of the LEISTRITZ extruder increased from 75° C. in zone 1 to about 170° C. in zone 8. A segmented screw was used having all forward conveying elements with the exception of zone 3, which was equipped with some forward kneading elements.

The silica coated beads were delivered into zone 1 of the LEISTRITZ extruder using a K-TRON LOSS-IN-WEIGHT feeder (available from K-Tron Corp.; Pitman, N.J.). The beads were melted in the first three zones of the extruder. The amounts and types of plasticizing agents listed in Table 10 were metered into zone 4 of the extruder using a Zenith pump (model #BPB-5596-0.584, commercially available from Zenith Pumps Division; Sanford N.C.). Mixing of the plasticizing agent and the molten beads was completed in the remaining zones of the extruder using only forward conveying elements.

To prepare coated samples for testing, the hot-melt processed plasticized PSA composition was collected and transferred to a Haake 18mm single screw extruder (available from Haake Co., Paramus, N.J.) equipped with a draw die and set at a melt temperature of 130° C. The PSA composition was coated onto the siliconized polyester release liner and the coating drawn to a thickness of about 75 microns. A indicated in Table 10 using a high intensity Fusion H-bulb. The siliconized polyester release liner was removed and the peel adhesion and shear strength of the crosslinked samples were measured as described above and the results of these tests are listed in Table 10.

TABLE 10

| Ex. | Base Copolymer (parts) | Plasticizing agent (parts) | UV Dose (mJ/cm$^2$) | Peel Adhesion[1] (N/dm) | Shear Strength (minutes) |
|---|---|---|---|---|---|
| 49 | BA/AA/IBA/ABP (35/10/55/0.2) | SANTICIZER 141 (25) | 100 | 42.7 | 130 (cohesive) |
| 50 | BA/AA/IBA/ABP (35/10/55/0.2) | SANTICIZER 141 (25) | 200 | 38.7 | 560 (cohesive) |
| 51 | BA/AA/IBA/ABP (35/10/55/0.2) | SANTICIZER 141 (25) | 300 | 37 | 1,372 (adhesive) |
| 52 | BA/AA/IBA/ABP (35/10/55/0.2) | PLASTHALL 7050 (20) | 100 | 29.3 | 4756 (adhesive) |
| 53 | BA/AA/IBA/ABP (35/10/55/0.2) | PLASTHALL 7050 (20) | 200 | 31.1 | 3459 (adhesive) |
| 54 | BA/AA/IBA/ABP (35/10/55/0.2) | PLASTHALL 7050 (20) | 300 | 30.6 | 2312 (adhesive) |
| 55 | BA/AA/IBA/ABP (35/10/55/0.2) | PLASTHALL DIODD (30) | 100 | 38.3 | 549 (cohesive) |
| 56 | BA/AA/IBA/ABP (35/10/55/0.2) | PLASTHALL DIODD (30) | 200 | 36.6 | 1453 (adhesive) |
| 57 | BA/AA/IBA/ABP (35/10/55/0.2) | PLASTHALL DIODD (30) | 300 | 38.5 | 1725 (adhesive) |
| 58 | BA/AA/IBA/ABP (35/10/55/0.2) | RX-13290 (30) | 100 | 47.9 | 40 (cohesive) |
| 59 | BA/AA/IBA/ABP (35/10/55/0.2) | RX-13290 (30) | 200 | 47.3 | 83 (cohesive) |

TABLE 10-continued

| Ex. | Base Copolymer (parts) | Plasticizing agent (parts) | UV Dose (mJ/cm$^2$) | Peel Adhesion[1] (N/dm) | Shear Strength (minutes) |
|---|---|---|---|---|---|
| 60 | BA/AA/IBA/ABP (35/10/55/0.2) | RX-13290 (30) | 300 | 58 | 127 (cohesive) |

[1]peel adhesion measured at 30 centimeters/minute peel rate

Examples 49–60 demonstrate that a range of peel performance and cohesive strength can be obtained from the same base copolymer compounded different plasticizing agents and/or using different degrees of UW curing.

Examples 61–81
Hot Melt Compounded Plasticized PSA Compositions Containing Suspension Polymerized Base Copolymer Containing A Range Of Acrylate and Acidic Polar Monomers Examples 61–81 illustrate the use of a variety of levels and types of acrylate monomers, copolymerizable monomers and acidic comonomers in the hot melt compounded plasticized pressure-sensitive adhesives of the invention. The suspension polymerized base copolymer particles were prepared from the polymerizable mixtures described in Table 11 according to the methods found in Examples 44–48. These particles were then silica coated, hot melt compounded with 35 pph SANTICIZER 141 plasticizing agent, die coated, UV crosslinked, and tested for peel adhesion and shear strength as described in Examples 49–60. The results of these test are found in Table 11. Unless noted, all shear strength test failures were cohesive in nature.

TABLE 11

| Ex. | Base Copolymer (parts) | Plasticizing agent (parts) | UV Dose (mJ/cm$^2$) | Peel Adhesion[1] (N/dm) | Shear Strength (minutes) |
|---|---|---|---|---|---|
| 61 | BA/AA/MAA/IBA/ABP (35/10/5/50/0.07) | SANTICIZER 141 (35) | 0 | 37.9 | 21 |
| 62 | BA/AA/MAA/IBA/ABP (35/10/5/50/0.07) | SANTICIZER 141 (35) | 200 | 38.7 | 23.5 |
| 63 | BA/AA/MAA/IBA/ABP (35/10/5/50/0.07) | SANTICIZER 141 (35) | 400 | 35 | 35 |
| 64 | BA/AA/MAA/IBA/ABP (35/10/5/50/0.15) | SANTICIZER 141 (35) | 0 | 49.9 | 18.5 |
| 65 | BA/AA/MAA/IBA/ABP (35/10/5/50/0.15) | SANTICIZER 141 (35) | 200 | 45.1 | 33.5 |
| 66 | BA/AA/MAA/IBA/ABP (35/10/5/50/0.15) | SANTICIZER 141 (35) | 400 | 38.1 | 244.5 |
| 67 | IOA/AA/MAA/IBA/ABP (35/10/5/50/0.07) | SANTICIZER 141 (35) | 0 | 41.8 | 40 |
| 68 | IOA/AA/MAA/IBA/ABP (35/10/5/50/0.07) | SANTICIZER 141 (35) | 200 | 33.5 | 160.5 |
| 69 | IOA/AA/MAA/IBA/ABP (35/10/5/50/0.07) | SANTICIZER 141 (35) | 400 | 29.3 | 271 |
| 70 | IOA/AA/MAA/IBA/ABP (35/10/5/50/0.15) | SANTICIZER 141 (35) | 0 | 36.6 | 21 |
| 71 | IOA/AA/MAA/IBA/ABP (35/10/5/50/0.15) | SANTICIZER 141 (35) | 200 | 39.2 | 148 |
| 72 | IOA/AA/MAA/IBA/ABP (35/10/5/50/0.15) | SANTICIZER 141 (35) | 400 | 33.5 | 406 |
| 73 | 2EHA/AA/MAA/IBA/ABP (35/10/5/50/0.15) | SANTICIZER 141 (35) | 0 | 36.1 | 38 |
| 74 | 2EHA/AA/MAA/IBA/ABP (35/10/5/50/0.15) | SANTICIZER 141 (35) | 200 | 35.9 | 1459 |
| 75 | 2EHA/AA/MAA/IBA/ABP (35/10/5/50/0.15) | SANTICIZER 141 (35) | 400 | 25.6 | 1561 (pop off) |
| 76 | BA/CHMA/AA/ABP (40/50/10/0.2) | SANTICIZER 141 (35) | 0 | 28.2 | 55 |
| 77 | BA/CHMA/AA/ABP (40/50/10/0.2) | SANTICIZER 141 (35) | 200 | 21.7 | 4700 (pop off) |

TABLE 11-continued

| Ex. | Base Copolymer (parts) | Plasticizing agent (parts) | UV Dose (mJ/cm$^2$) | Peel Adhesion[1] (N/dm) | Shear Strength (minutes) |
|---|---|---|---|---|---|
| 78 | BA/CHMA/AA/ABP (40/50/10/0.2) | SANTICIZER 141 (35) | 400 | 18.2 | 342 (pop off)9 |
| 79 | BA/CHMA/AA/ABP (45/50/5/0.2) | SANTICIZER 141 (35) | 0 | 21.5 | 26 |
| 80 | BA/CHMA/AA/ABP (45/50/5/0.2) | SANTICIZER 141 (35) | 200 | 14.9 | 1834 (pop off) |
| 81 | BA/CHMA/AA/ABP (45/50/5/0.2) | SANTICIZER 141 (35) | 400 | 21.9 | 593 (pop off) |

[1]peel adhesion measured at 30 centimeters/minute peel rate

These examples show that monomeric types and levels, photocrosslinker levels, and radiation dosage can all be varied to yield hot melt acrylate pressure sensitive adhesives having a broad range of peel adhesion and shear strength performance. To optimize shear strength of these compositions, crosslinking agent levels and/or different crosslinking agents can be used as known in the art.

Examples 82–88

Plasticized PSA Compositions Containing Packaged Bulk Polymerized Plasticized Acrylate Copolymer (35/10/55/0.15 BA/AA/IBA/ABP)

Packaged bulk polymerized plasticized acrylate pressure sensitive adhesive compositions were packaged, polymerized, coated and crosslinked according to the following method: Two sheets of a heat sealable ethylene vinyl acetate film having a thickness of 64 micrometers and a 6 mole % vinyl acetate content (VA24, commercially available from Consolidated Thermoplastics Co.; Schaumburg, Ill.) were heat sealed on the lateral edges and the bottom to form a rectangular pouch measuring approximately 5 cm wide. Polymerizable mixtures comprising 35 parts BA, 55 parts IBA, 10 parts AA, 0.15 part ABP photocrosslinking agent, 30 pph SANTICIZER 141 plasticizing agent, 0.11 parts of Irgacure 651 and 0.05 parts IOTG chain transfer agent were prepared and 20 ml of each mixture was delivered via syringe into the unsealed edge of the pouch. The unsealed edge of the filled pouch was then heat sealed to form 5 cm by 8.9 cm pouches containing 19 grams of the polymerizable mixture.

The pouches were placed in a water bath that was maintained at about 16° C. and exposed to ultraviolet radiation at an intensity of about 3.5 mW/cm$^2$ for 8.5 minutes (UV Exp Time). The radiation was supplied from lamps having about 90% of the emissions between 300 and 400 nanometers (nm), and a peak emission at 351 nm.

The polymerized compositions were removed from the pouches and dissolved into ethyl acetate to form a 40% solution of the plasticized acrylate pressure sensitive adhesive composition. The solutions were then knife coated onto a 37 micron primed polyester film and dried in a 200 F oven for 30 minutes forming an adhesive coating having the thicknesses recorded in Tables 12 and 13.

Examples 82–85 were further photocrosslinked by the use of a Fusion Systems UV processor using an "H" bulb at full power, exposing each sample to the total energy dose listed in Table 12. These photocrosslinked samples were tested for peel adhesion and shear strength as described above. The results of these tests are also recorded in Table 12.

TABLE 12

| Ex. | Base Copolymer (parts) | Plasticizing agent (parts) | UV Dose (mJ/cm$^2$) | Coating Thickness (microns) | Peel Adhesion[1] (N/dm) | Shear Strength (minutes) |
|---|---|---|---|---|---|---|
| 82 | BA/AA/IBA/ABP (35/10/55/0.15) | SANTICIZER 141 (30) | 0 | 36 | 49 | 62 (cohesive) |
| 83 | BA/AA/IBA/ABP (35/10/55/0.15) | SANTICIZER 141 (30) | 100 | 33 | 48.8 | 682 (cohesive) |
| 84 | BA/AA/IBA/ABP (35/10/55/0.15) | SANTICIZER 141 (30) | 200 | 38 | 55.6 | 3762 (cohesive) |
| 85 | BA/AA/IBA/ABP (35/10/55/0.15) | SANTICIZER 141 (30) | 400 | 33 | 53 | 3444 (cohesive) |

[1]peel adhesion measured at 30 centimeters/minute peel rate

Examples 86–88 were alternatively thermally crosslinked using a bisamide (N,N'-bis-1,2-propyleneterephthalamide) crosslinking agent by adding the amount of crosslinking agent shown in Table 13 (based on 100 parts of base copolymer) to the plasticized acrylate pressure sensitive adhesive solution prior to sample coating and drying. These thermally crosslinked samples were tested for peel adhesion and shear strength as described above. The results of these tests are also recorded in Table 13.

TABLE 13

| Ex. | Base Copolymer (parts) | Plasticizing agent (parts) | Bisamide (parts) | Coating Thickness (microns) | Peel Adhesion[1] (N/dm) | Shear Strength (minutes) |
|---|---|---|---|---|---|---|
| 86 | BA/AA/IBA/ABP (35/10/55/0.15) | SANTICIZER 141 (30) | 0.1 | 69 | 82.5 | 10,000 (some slippage) |
| 87 | BA/AA/IBA/ABP (35/10/55/0.15) | SANTICIZER 141 (30) | 0.2 | 64 | 67.4 | 10,000 (some slippage) |
| 88 | BA/AA/IBA/ABP (35/10/55/0.15) | SANTICIZER 141 (30) | 0.3 | 64 | 67.4 | 10,000 (some slippage) |

[1]peel adhesion measured at 30 centimeters/minute peel rate

Various modifications and alterations of this invention will become apparent to those skilled in the art without departing from the scope and principles of this invention, and it should be understood that this invention is not to be unduly limited to the illustrative embodiments set forth hereinabove. All publications and patents are incorporated herein by reference to the same extent as if each individual publication or patent was specifically and individually indicated to be incorporated by reference.

What is claimed:

1. A plasticized polymer-based acrylic pressure-sensitive adhesive comprising a mixture of:
   a. about 100 parts by weight of a base copolymer having a Tg greater than about 0° C., wherein the base copolymer is formed from and comprises:
      (1) about 50 to 70% by weight of a high Tg comonomer component, wherein the homopolymer formed from the high Tg comonomer component has a Tg of at least about 20° C.;
      (2) optionally, up to about 20% by weight based on the total weight of the base copolymer of an acidic comonomer; and
      (3) about 30 to 50% by weight of one or more low Tg (meth)acrylate comonomer, wherein the Tg of the homopolymer of the low Tg comonomer is less than about 20° C., and
   b. about 1 to about 100 parts based on the base copolymer of a non-reactive, non-volatile, non-acrylic-based plasticizing agent, wherein the mixture has a maximum shear storage modulus of 5×10⁵ Pascals at 25° C. and 1 Hz.

2. The plasticized polymer based pressure sensitive adhesive according to claim 1 wherein the high Tg comonomer component is an ethylenically unsaturated monomer or mixture thereof.

3. The plasticized polymer based pressure sensitive adhesive according to claim 1 wherein the high Tg comonomer component is selected from the group consisting of lower alkyl (C1–C4) methacrylates, vinyl esters, N-vinyl lactams, substituted (meth)acrylamides, maleic anhydride, (meth) acrylate esters of cycloalkyl, aromatic or bridged cycloalkyl alcohols, styrene, substituted styrene or mixtures thereof.

4. The plasticized polymer based pressure sensitive adhesive according to claim 3 wherein the high Tg comonomer component is selected from the ethyl methacrylate, methyl methacrylate, isobornyl acrylate, isobornyl methacrylate, 4-t-butyl cyclohexyl methacrylate, 4-t-butyl cyclohexyl acrylate, cyclohexyl methacrylate, N,N-dimethyl acrylamide, N,N-dimethyl methacrylamide, acrylonitrile, and mixtures thereof.

5. The plasticized polymer based pressure sensitive adhesive according to claim 1 wherein the low Tg (meth)acrylate comonomer is a monofunctional unsaturated monomer.

6. The plasticized polymer based pressure sensitive adhesive according to claim 5 wherein the monofunctional unsaturated monomer is a (meth)acrylate ester of non-tertiary alkyl alcohols, the alkyl group of which comprise from 1 to about 18 carbon atoms; and mixtures of (meth) acrylate esters of non-tertiary alcohols.

7. The plasticized polymer based pressure sensitive adhesive according to claim 6 wherein the (meth)acrylate monomer, when homopolymerized has a Tg below 20° C. and has the general formula:

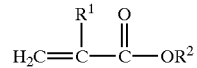

wherein $R^1$ is H or $CH_3$, the latter corresponding to where the (meth)acrylate monomer is a methacrylate monomer and $R^2$ is selected from linear or branched hydrocarbon groups and may contain one or more heteroatoms and the number of carbon atoms in the hydrocarbon group is 1 to about 18.

8. The plasticized polymer based pressure sensitive adhesive according to claim 7 wherein the (meth)acrylate monomers are selected from the group consisting of n-butyl acrylate, ethoxyethoxyethyl acrylate, 2-ethylhexyl acrylate, isooctyl acrylate, lauryl acrylate, and mixtures thereof.

9. The plasticized polymer based pressure sensitive adhesive according to claim 1 wherein the acidic comonomer is ethylenically unsaturated carboxylic acid, ethylenically unsaturated sulfonic acid, ethylenically unsaturated phosphonic acid and mixtures thereof.

10. The plasticized polymer based pressure sensitive adhesive according to claim 9 wherein the acidic comonomer is acrylic acid, β-carboxyethyl acrylate and methacrylic acid.

11. The plasticized polymer based pressure sensitive adhesive according to claim 1 wherein the plasticizing agent is either a liquid or a solid.

12. The plasticized polymer based pressure sensitive adhesive according to claim 1 wherein the plasticizing agent is either a monomeric plasticizing agent or a non-acrylic polymeric plasticizing agent.

13. The plasticized polymer based pressure sensitive adhesive according to claim 12 wherein the monomeric plasticizing agent is an ester of a mono- or multibasic acid.

14. The plasticized polymer based pressure sensitive adhesive according to claim 12 wherein the polymeric, non-acrylic plasticizing agent is a polyurethane, polyurea, polyvinylether, polyether, polyester or mixtures thereof.

15. The plasticized polymer based pressure sensitive adhesive according to claim 12 wherein the plasticizing agent is selected from the group consisting of polyalkylene oxides having weight average molecular weights of about 150 to about 5,000; alkyl or aryl functionalized polyalkylene oxides; benzoyl functionalized polyethers; monomethyl ethers of polethylene oxides; monomeric adipates; polymeric adipates; citrates; phthalates; phosphate esters; glutarates; and mixtures thereof.

16. The plasticized polymer based pressure sensitive adhesive according to claim 1 wherein the base copolymer further comprises one or more of (a) an initiator, (b) at least one chain transfer agent, and (c) at least one crosslinking agent.

17. A plasticized polymer based pressure sensitive adhesive comprising a mixture of:
 a. about 100 parts by weight of a base copolymer having a Tg greater than about 0° C., wherein the base copolymer is in a particulate and formed from and comprises:
  (1) about 50 to 70% by weight of a high Tg comonomer component, wherein the homopolymer formed from the high Tg comonomer component has a Tg of at least about 20° C.;
  (2) optionally, up to about 20% by weight based on the total weight of the base copolymer of an acidic comonomer; and
  (3) about 30 to 50% by weight of one or more low Tg (meth)acrylate comonomer, wherein the Tg of the homopolymer of the low Tg comonomer is less than about 20° C., and
 b. about 1 to about 100 parts based on the base copolymer of a non-reactive, non-volatile, non-acrylic-based plasticizing agent.

18. A method of coating a plasticized polymer based pressure sensitive adhesive comprising the steps of:
 a. admixing about 100 parts by weight of a base copolymer having a Tg greater than about 0° C. and about 1 to about 100 parts of a non-reactive, non-volatile, non-acrylic-based plasticizing agent, wherein the base copolymer is formed from:
  (1) about 50 to 70% by weight of a high Tg comonomer component, wherein the homopolymer formed from the high Tg comonomer component has a Tg of at least about 20° C.;
  (2) optionally, up to about 20% by weight based on the total weight of the base copolymer of an acidic comonomer; and
  (3) about 30 to 50% by weight of one or more low Tg (meth)acrylate comonomer, wherein the Tg of the homopolymer of the low Tg comonomer is less than about 20° C., and
 b. coating the admixture prepared according to part (a) onto a substrate from a solvent or aqueous solution.

19. A method of coating a plasticized polymer based pressure sensitive adhesive comprising the steps of:
 a. powder coating a layer of a powdered base copolymer having a Tg greater than about 0° C. onto a substrate, wherein the base copolymer is formed from:
  (1) about 50 to 70% by weight of a high Tg comonomer component, wherein the homopolymer formed from the high Tg comonomer component has a Tg of at least about 20° C.;
  (2) optionally, up to about 20% by weight based on the total weight of the base copolymer of an acidic comonomer; and
  (3) about 30 to 50% by weight of one or more low Tg (meth)acrylate comonomer, wherein the Tg of the homopolymer of the low Tg comonomer is less than about 20° C., and
 c. coating a liquid, non-reactive, non-acrylic-based plasticizing agent over all or a portion of the powdered base copolymer layer such that about 100 parts of the coated base copolymer are plasticized with about 1 to 100 parts of the non-reactive, non-acrylic-based plasticizing agent.

20. A method of coating a plasticized polymer based pressure sensitive adhesive comprising the steps of:
 a. coating a layer of a base copolymer having a Tg greater than about 0° C. onto a substrate, wherein the base copolymer is formed from:
  (1) about 50 to 70% by weight of a high Tg comonomer component, wherein the homopolymer formed from the high Tg comonomer component has a Tg of at least about 20° C.;
  (2) optionally, up to about 20% by weight based on the total weight of the base copolymer of an acidic comonomer; and
  (3) about 30 to 50% by weight of one or more low Tg (meth)acrylate comonomer, wherein the Tg of the homopolymer of the low Tg comonomer is less than about 20° C., and
 b. coating a liquid or solid, non-reactive, non-acrylic-based plasticizing agent over all or a portion of the powdered base copolymer layer such that about 100 parts of the coated base copolymer are plasticized with about 1 to 100 parts of the non-reactive, non-acrylic-based plasticizing agent.

21. A method of coating a plasticized polymer based pressure sensitive adhesive using radiation polymerization methods comprising the steps of:
 a. preparing a prepolymeric syrup comprising:
  (1) about 50 to 70% by weight of a high Tg comonomer component, wherein the homopolymer formed from the high Tg comonomer component has a Tg of at least about 20° C.;
  (2) optionally, up to about 20% by weight based on the total weight of the base copolymer of an acidic comonomer; and
  (3) about 30 to 50% by weight of one or more low Tg (meth)acrylate comonomer, wherein the Tg of the homopolymer of the low Tg comonomer is less than about 20° C., and
 b. combining the prepolymeric syrup with about 1 to 100 parts based on 100 parts of the sum of components a(1) to a(3) of a non-reactive, non-volatile, non-acrylic-based plasticizing agent to form a polymerizable mixture; and
 c. exposing the polymerizable mixture to radiation sufficient to polymerize the polymerizable mixture and to form the plasticized polymer based pressure sensitive adhesive.

* * * * *

UNITED STATES PATENT AND TRADEMARK OFFICE
CERTIFICATE OF CORRECTION

PATENT NO.    : 6,624,273 B1
DATED         : September 23, 2003
INVENTOR(S)   : Everaerts, Albert I.

It is certified that error appears in the above-identified patent and that said Letters Patent is hereby corrected as shown below:

Column 10,
Line 41, delete ":" following "readily";

Column 19,
Line 1, delete "." following "pressure";
Line 10, delete "." preceeding "heated";

Column 27,
Line 65, insert -- 10,000+ -- in "Shear Strength (minutes)" column;

Column 31,
Line 41, delete "leistritz", insert in place thereof -- Leistritz --.

Signed and Sealed this

Eleventh Day of May, 2004

JON W. DUDAS
*Acting Director of the United States Patent and Trademark Office*